(12) United States Patent
Dell

(10) Patent No.: US 9,842,425 B2
(45) Date of Patent: Dec. 12, 2017

(54) SYSTEM AND METHOD FOR RENDERING THREE-DIMENSIONAL SCENES BY A COMPUTER GRAPHICS PROCESSOR USING ORTHOGONAL PROJECTION

(71) Applicant: EUCLIDEON PTY LTD, Murrarie, Queensland (AU)

(72) Inventor: Bruce Robert Dell, Murrarie (AU)

(73) Assignee: Euclideon Pty Ltd., Murrarie, QLD (AU)

( * ) Notice: Subject to any disclaimer, the term of this patent is extended or adjusted under 35 U.S.C. 154(b) by 290 days.

(21) Appl. No.: 14/429,824

(22) PCT Filed: Sep. 21, 2012

(86) PCT No.: PCT/AU2012/001130
§ 371 (c)(1),
(2) Date: Mar. 20, 2015

(87) PCT Pub. No.: WO2014/043735
PCT Pub. Date: Mar. 27, 2014

(65) Prior Publication Data
US 2015/0279085 A1   Oct. 1, 2015

(51) Int. Cl.
*G06T 15/08*  (2011.01)
*G06T 11/00*  (2006.01)
(Continued)

(52) U.S. Cl.
CPC ............ *G06T 15/08* (2013.01); *G06T 11/006* (2013.01); *G06T 15/10* (2013.01); *G06T 19/20* (2013.01);
(Continued)

(58) Field of Classification Search
None
See application file for complete search history.

(56) References Cited

U.S. PATENT DOCUMENTS

| | | | | |
|---|---|---|---|---|
| 5,123,084 A | * | 6/1992 | Prevost | G06T 17/005 345/420 |
| 7,940,279 B2 | * | 5/2011 | Pack | G06T 15/04 345/582 |

(Continued)

FOREIGN PATENT DOCUMENTS

| | | |
|---|---|---|
| EP | 0794516 | 9/1997 |
| EP | 1276076 | 1/2003 |

(Continued)

OTHER PUBLICATIONS

Jun Liang et al., "Object Recognition Based on Three-Dimensional Model," in Grid and cooperation computing—GCC 2004; third international conference, Wuhan, China, Oct. 21-24, 2004.

(Continued)

*Primary Examiner* — Michael J Cobb
(74) *Attorney, Agent, or Firm* — Stephen T. Scherrer; Monique A. Morneault; Scherrer Patent & Trademark Law, P.C.

(57) ABSTRACT

A method is provided for rendering a three dimensional scene upon an electronic processor based system such as a computer, cellular phone, games console or other device. The method involves rendering a three dimensional scene by activating pixels of an electronic display device using a perspective projection for some portions of the scene and an orthogonal projection for others. A far less computationally expensive orthogonal projection is used for rendering other portions of the scene which meet a predetermined condition. The method results in a rendered scene displayed by pixels of the display device that appears overall to have been realistically rendered using a perspective transformation. However, since portions of the rendered scene have been rendered using an orthogonal projection, the method is (Continued)

computationally less expensive than rendering using only perspective projection.

15 Claims, 24 Drawing Sheets

(51) Int. Cl.
    *G06T 19/20*     (2011.01)
    *G06T 15/10*     (2011.01)

(52) U.S. Cl.
    CPC   *G06T 2219/028* (2013.01); *G06T 2219/2004* (2013.01)

(56) References Cited

U.S. PATENT DOCUMENTS

| | | |
|---|---|---|
| 2002/0054129 A1 | 5/2002 | Heron et al. |
| 2002/0118188 A1* | 8/2002 | Zviaguina ............... G06T 15/40 345/421 |
| 2006/0256112 A1* | 11/2006 | Heirich ................... G06T 15/00 345/427 |
| 2007/0040833 A1* | 2/2007 | Buyanovski ............ G06T 15/06 345/426 |
| 2008/0144968 A1 | 6/2008 | Cohen et al. |

FOREIGN PATENT DOCUMENTS

| | | |
|---|---|---|
| EP | 1321894 | 6/2003 |
| JP | 2004078893 | 3/2004 |
| TW | 200537395 | 11/2005 |
| TW | 201015490 | 4/2010 |
| TW | 201230776 | 7/2012 |
| WO | 2006122212 | 11/2006 |

OTHER PUBLICATIONS

John Willats et al., "Defining Pictorial Style: Lessons from Linguistics and Computer Graphics," Axiomathes, Kluwer Academic Publishers, DO, vol. 15, No. 3, Sep. 1, 2005, pp. 319-351.
EPO search report dated Feb. 26, 2016 from EP Application No. 12 88 4956.
Page of references cited in Taiwan office action.

* cited by examiner

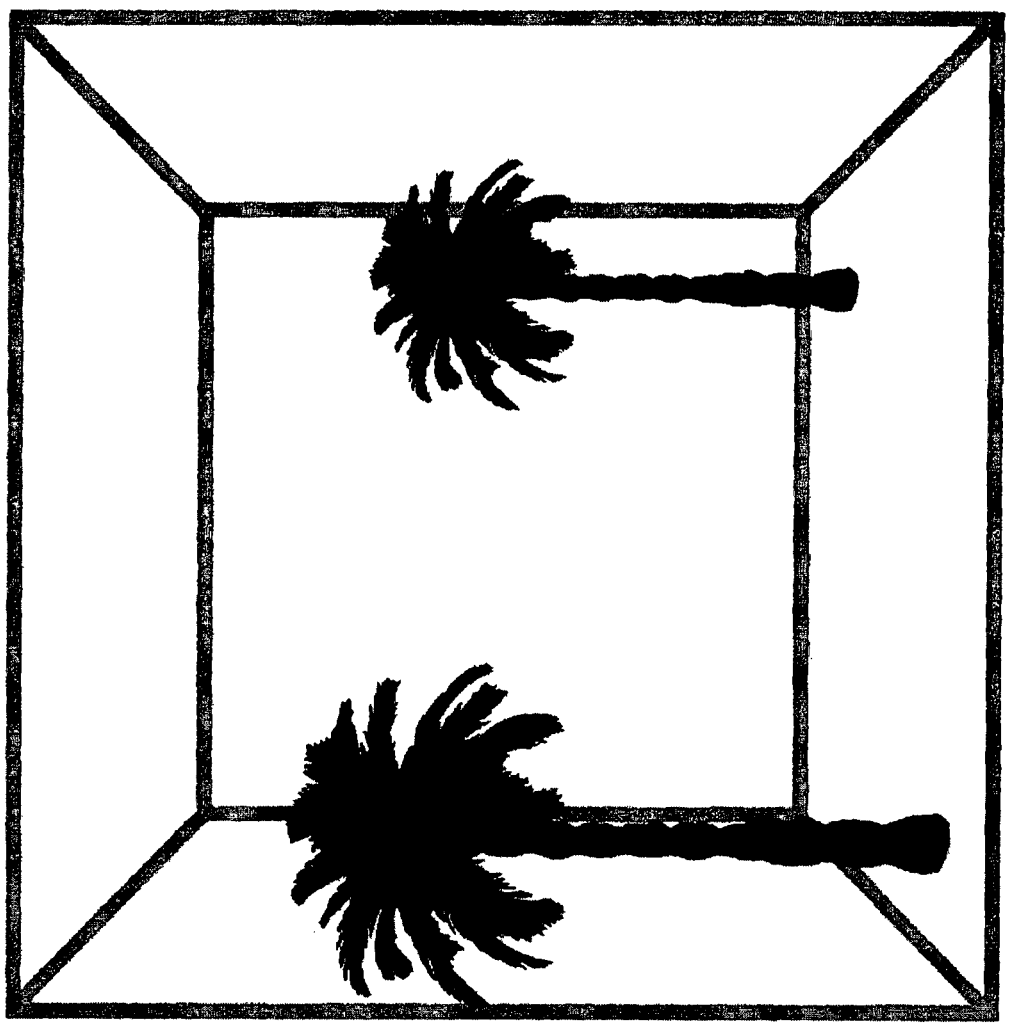

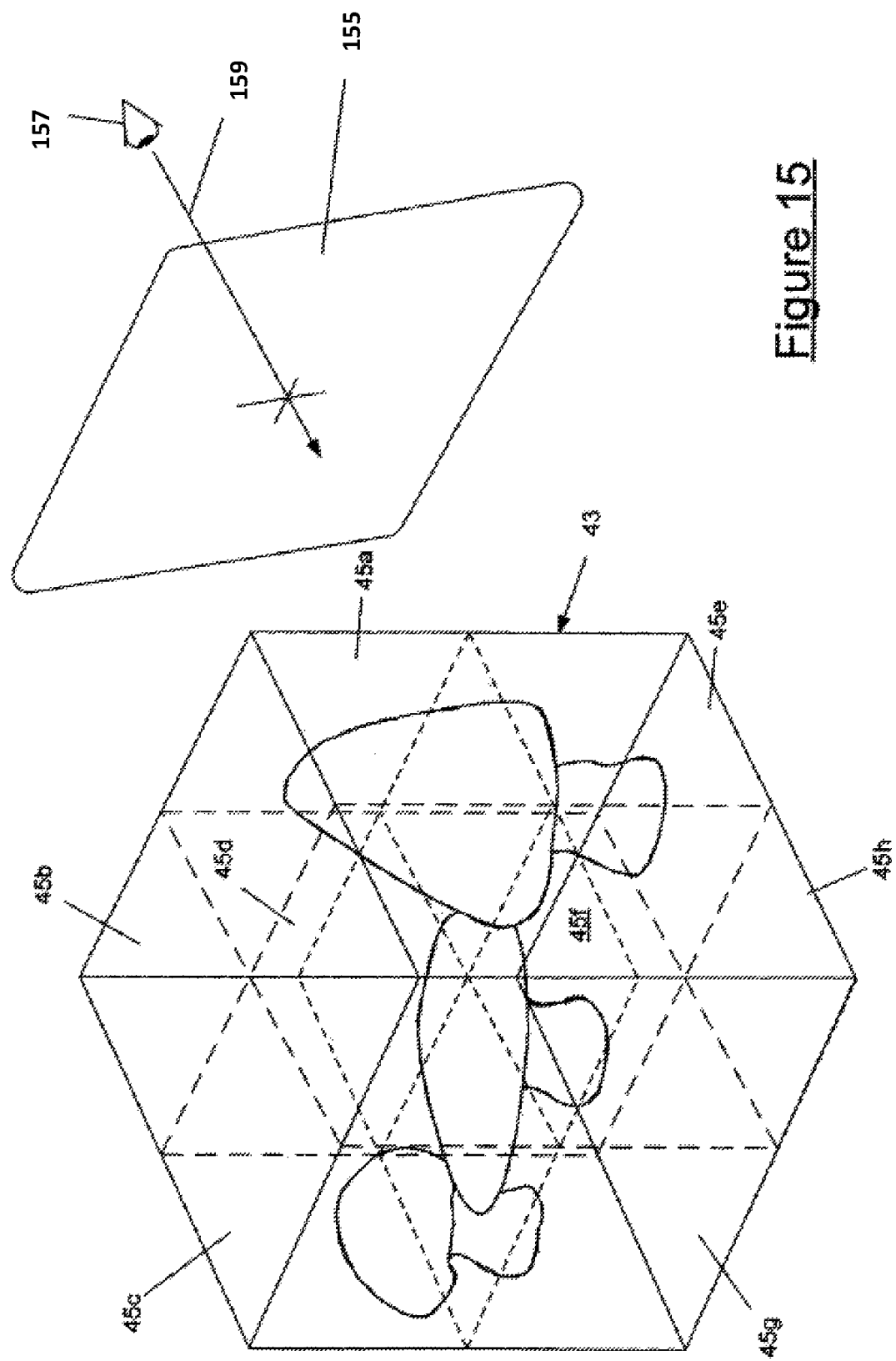

SYSTEM AND METHOD FOR RENDERING THREE-DIMENSIONAL SCENES BY A COMPUTER GRAPHICS PROCESSOR USING ORTHOGONAL PROJECTION

TECHNICAL FIELD

The present invention concerns a computer graphics method for rendering three dimensional scenes.

BACKGROUND ART

Any references to methods, apparatus or documents of the prior art are not to be taken as constituting any evidence or admission that they formed, or form part of the common general knowledge in any country in the world.

3D computer graphics technology is used to convert data describing a three dimensional scene into a two-dimensional image for viewing on an electronic display screen. It will be understood that the term "scene" as used herein, including throughout the claims, is to be understood in a broad sense as including both very complex scenes but also those that comprise only a few or a single object or indeed at its very simplest merely a collection of one or more visible points.

One area, though by no means the only area, where intensive computer graphics development has occurred over the last two decades has been that of computer and video gaming.

The development and marketing of computer games is now a very significant proportion of the global entertainment industry. For example, in 2010 the CALL OF DUTY BLACK OPS® video game enjoyed over US$650 million worth of sales in its first five days of retailing.

In order to afford game players with an ever more realistic gaming experience, much development has been poured into increasing the speed and realism with which game scenes can be rendered.

During the rendering of a game scene the data which represents the scene, e.g. the positional data associated with each object in the scene, must be processed by the processors of the gaming machine to project the data from the 3D space of the scene to 2D data suitable for display by the machines display device. This transformation must take into account the position and viewing angle of the player relative to the scene. Since humans perceive perspective foreshortening in their normal visual system, the computer graphics rendering methods typically employ perspective projections.

Perspective projections are computationally intensive because they involve trigonometric calculations which are typically applied with operations including matrix and vector multiplications. Consequently, as the amount of detail, e.g. positional data, that is recorded in scene increases, the number of lengthy calculations that must be employed to render the scene also increases. These additional calculations may require that the game be played at a reduced frame rate.

Therefore, it will be realized that there is a tradeoff between increasing scene realism and maintaining frame rate. One widely adopted approach to addressing this problem has been to render scenes using a plurality of flat polygons. Polygon meshes are used to model the objects of the scene that it is desired to render. The corners of the polygons are then transformed from 3D to 2D and displayed to the user. In order to accommodate both increased scene detail and high frame rates manufactures such as ATI and NVIDIA develop and market dedicated graphics processor cards for incorporation into gaming machines.

However, there are many limitations associated with polygon systems as they are presently implement. For example, because polygons have linear boundaries they cannot be used to represent curved objects easily. Furthermore, even with the use of dedicated graphics processors, the human eye is still sensitive to curved objects being approximated with the straight edges of polygons. Consequently, these polygon based systems are both computationally intensive to implement and also unsatisfying to discerning game players.

It would be advantageous if a computer graphics method for displaying three dimensional scenes were provided that overcame the problems of the prior art discussed above or which is at least a useful alternative to those methods that have hitherto been known.

SUMMARY OF THE INVENTION

According to a first aspect of the present invention there is provided a computer graphics method implemented upon an electronic processor based system having at least one processor arranged to control an electronic display device, said method comprising the steps of operating the processor to:
  extract data defining a three-dimensional scene from a data structure;
  render extracted data corresponding to portions of the scene satisfying a predetermined condition according to an orthogonal projection upon the electronic display device; and
  render extracted data corresponding to other portions of the scene according to a perspective projection upon the electronic display device;
  wherein the rendered scene displayed upon said display device appears to have been entirely rendered according to the perspective projection, whereby a count of calculations performed by the electronic processor for rendering the scene is reduced relative to rendering using only the perspective projection.

According to a first aspect of the present invention there is provided a computer graphics method to be implemented by an electronic processor based system, said method comprising:
  processing a data structure containing data for a three-dimensional (3D) scene to be represented by an electronic display;
  rendering portions of the scene satisfy a predetermined condition with an orthogonal projection; and
  otherwise rendering the scene using a perspective projection; whereby the number of calculations performed by the electronic processor for rendering the scene are reduced.

In a preferred embodiment the method includes testing if portions of the scene satisfy the predetermined condition taking into account dimensions of the portions, focal length of the perspective projection and resolution of said display.
  Preferably the method includes:
  projecting 3D points associated with the portions of the scene satisfying the predetermined condition from 3D to 2D to produce a 2D form pattern; and
  determining projections of sub-portions of the scene based upon the 2D form pattern.

In a preferred embodiment the method includes recursively updating the 2D form pattern and determining projections of lower level sub-portions with reference to the updated form pattern.

The step of recursively updating the 2D form pattern will preferably include bit shifting values representing coordinates of vertices of the form pattern.

Alternatively, the step of recursively updating the 2D form pattern may include applying multiply-and-add (MAD) or fused multiply-and-add (FMAD) operations to values representing coordinates of vertices of the form pattern. For example the step may include multiplying by 0.5 in order to halve values representing coordinates of vertices of the form pattern.

The step of recursively updating the 2D form pattern may include calculating an offset from a minimum value of a bounding box about a form pattern of previous iteration of the recursion.

In a preferred embodiment the data structure comprises an Octree and the step of processing the data structure includes traversing the Octree to extract data representing the scene therefrom.

Where the data structure comprises an Octree said portions correspond to parent and child octants associated with the Octree.

Preferably the method involves determining a sequence for processing nodes of the Octree in front to back order relative to a predetermined viewing position.

Furthermore, the method may include testing if bounds of an octant intersect a view frustum.

Preferably the method includes performing a mask test prior to writing to said display.

The method may also include performing an occlusion test prior to writing to said display.

According to a further aspect of the present invention there is provided a computer graphics system including a processor in communication with a memory device storing a data structure for a three dimensional (3D) scene and arranged to control a display device, the processor being arranged to:
  process the data structure to retrieve data defining said scene;
  render portions of the scene satisfying a predetermined condition with an orthogonal projection; and
  otherwise render the scene upon the display device using a perspective projection;
  whereby the number of calculations performed by the electronic processor for rendering the scene are reduced by use of the orthogonal projection relative to rendering using only the perspective projection.

Preferably the processor of the computer graphics system is further arranged to:
  project 3D points associated with the portions of the scene satisfying the predetermined condition from 3D to 2D to produce a 2D form pattern; and
  determine projections of sub-portions of the scene based upon the 2D form pattern.

In a preferred embodiment, the processor of the computer graphics system is further arranged to test if portions of the scene satisfy the predetermined condition taking into account dimensions of the portions, focal length of the perspective projection and resolution of the display.

The processor of the computer graphics system is preferably further arranged to project 3D points associated with the portions of the scene satisfying the predetermined condition from 3D to 2D to produce a 2D form pattern; and
  determine projections of sub-portions of the scene based upon the 2D form pattern without recourse to a 3D to 2D projection.

According to a further aspect of the present invention there is provided a computer graphics software product comprising a computer readable media bearing tangible instructions for execution by a processor for carrying out the previously described method.

According to a further aspect of the present invention there is provided a computer graphics method to be implemented by an electronic processor based system for rendering a portion of a scene with an orthogonal projection, the method including the steps of:
  projecting 3D points associated with a bounding box about the portion from 3D to 2D to produce a 2D form pattern; and
  determining projections of sub-portions of the scene based upon the 2D form pattern.

According to a further aspect of the present invention there is provided a computer graphics software product comprising a computer readable media bearing tangible instructions for execution by a processor for carrying out the previously described method.

According to another aspect of the present invention there is provided a computer graphics system including a processor in communication with a memory device storing a data structure for a three dimensional (3D) scene and arranged to control a display device, the processor being arranged to:
  process the data structure to retrieve data defining said scene;
  project 3D points associated with a bounding box about a portion of the scene from 3D to 2D to produce a 2D form pattern; and
  produce projections of sub-portions of the scene based upon the 2D form pattern.

According to further aspect of the present invention there is provided A computer graphics method for producing an image so that it appears to have been produced with a first projection, said method being performed with a computer system including at least one processor arranged to control pixels of an electronic display device, said method including:
  generating portions of the image on said display with the first projection; and
  while a second projection approximates the first projection generating other portions of the image on said display with the second projection,
  wherein the second projection is less computationally intensive than the first projection.

According to a first aspect of the present invention there is provided a computer graphics method to be implemented by an electronic processor based system, said method comprising:
  processing a data structure containing data for a three-dimensional (3D) scene to be represented by an electronic display;
  rendering portions of the scene satisfy a predetermined condition with an orthogonal projection; and
  otherwise rendering the scene using a perspective projection;
whereby the number of calculations performed by the electronic processor for rendering the scene are reduced.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 7 Illustrates objects within a cube with perspective.

FIG. 15 Illustrates high level Octree cubes of an Octree cube structure defining an exemplary scene.

DETAILED DESCRIPTION OF PREFERRED EMBODIMENTS

Figure 1:
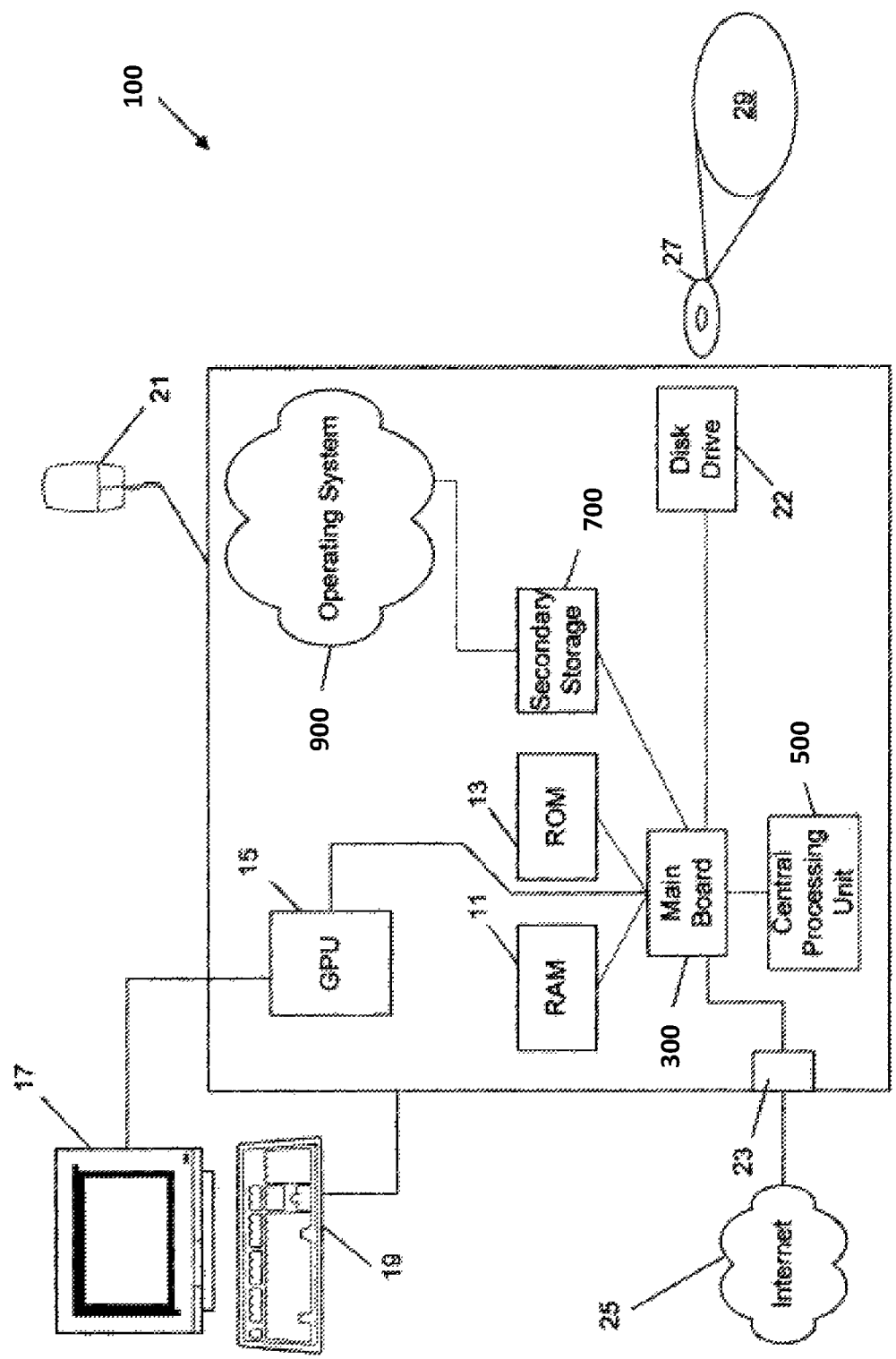
FIG. 1. Illustrates a computer system for implementing a method according to an embodiment of the present invention.

Referring now to FIG. 1, there is shown a block diagram of an exemplary computer system 1 for carrying out a method according to an embodiment of the invention that will be described.

It will be understood that the computer system 1 comprises an exemplary electronic processor based system for carrying out the method. However, the method may also be readily performed with other electronic processor based systems. Such systems may include, without limitation, gaming consoles, tablet, laptop and netbook computational devices, cellular smart phones and medical imaging equipment.

The computer system 100 includes a main board 300 which includes circuitry for powering and interfacing to at least one onboard processor 500. The at least one onboard processor may comprise two or more discrete processors or processors with multiple processing cores.

A non-limiting example of a microprocessor, that is presently popular in personal computers used for playing computer games, is one of the i5 or i7 families of processors manufactured by Intel Corp.

The main board 300 acts as an interface between microprocessor 500 and secondary memory 700. The secondary memory 700 may comprise one or more optical or magnetic, or solid state, drives. The secondary memory 9 stores instructions for an operating system 900. The main board 300 also communicates with random access memory 11 and read only memory 13. The ROM 13 typically stores instructions for a Basic Input Output System (BIOS) which the microprocessor 500 accesses upon start up and which preps the microprocessor 500 for loading of the operating system 900.

The main board 300 also interfaces with a graphics processor unit 15. It will be understood that in some systems the graphics processor unit 15 is integrated into the main board 300.

The main board 300 will typically include a communications adapter, for example a LAN adaptor or a modem, that places the computer system 100 in data communication with a computer network such as the internet 25.

A user of the computer system 100 interfaces with it by means of keyboard 19, mouse 21 and display 17.

The user of system 100 may operate the operating system 900 to load a computer graphics related software product 29. The computer graphics related software product 29 is provided as tangible instructions borne upon a computer readable media such as optical disk 27. Alternatively it might also be downloaded via port 23.

The computer graphics related software product 29 includes data structures that store data defining various scenes of, for example, a game.

The software product 29 also includes instructions for the microprocessor 500 and possibly for the GPU 15 to manipulate the scene data in response to inputs received from the user via operator controls such as keyboard 19 and mouse 21.

It will be realised that there are many types of computer data structure that may be used to store scene data. In a preferred embodiment of the present invention an Octree data structure is used however while such a structure is preferred other types of data structure, for example binary-space partitioning trees (BSP-trees) might also be used.

Whatever type of data structure is used to store the positional data of the scene it will be necessary to transform that data from 3D to 2D for display upon display device 17.

Figure 2:
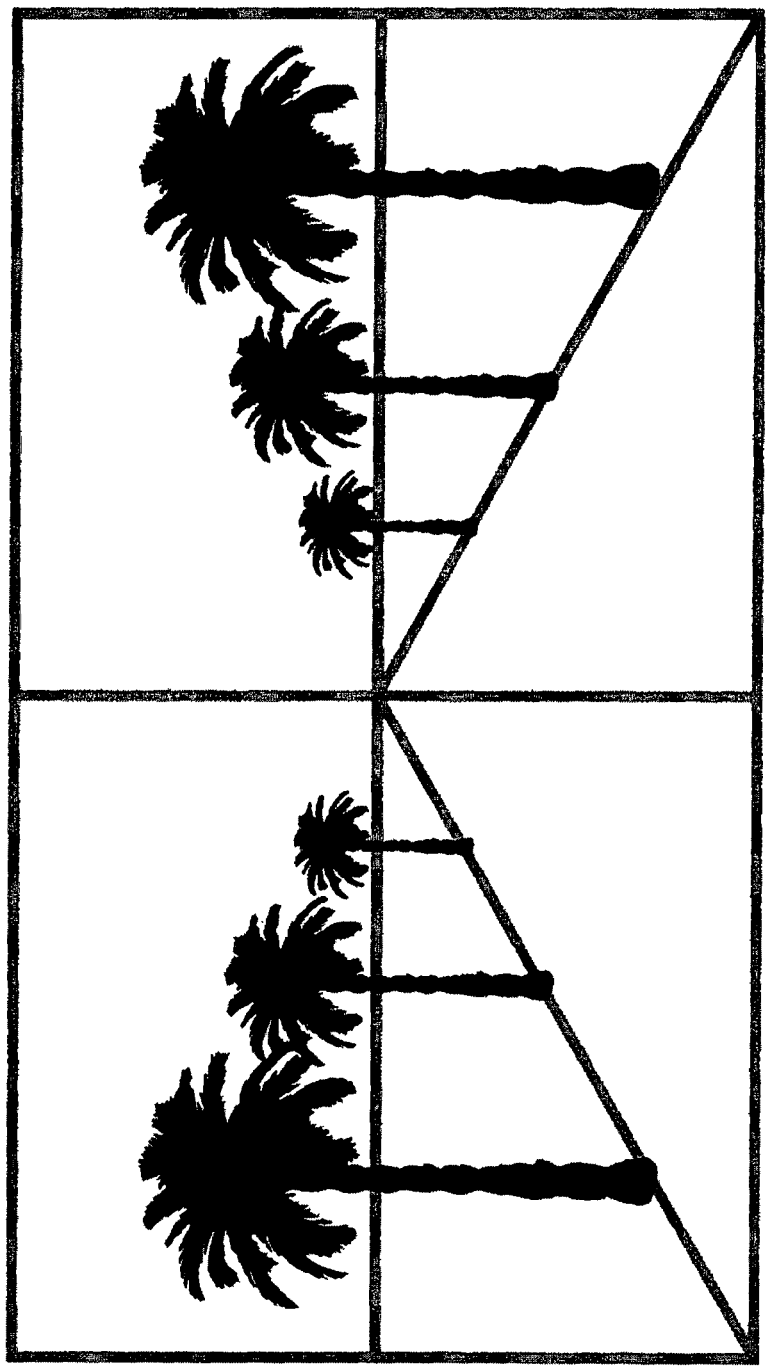
FIG. 2 Illustrates objects with perspective.

One of the major differences between 3d and 2d graphics is the concept of perspective and size reduction due to distance from the viewpoint. In FIG. 2, the objects get smaller according to their distance from the viewpoint. Calculating this distance adds significantly more work to the many 3d to 2d calculations associated with 3d graphics.

Figure 3:
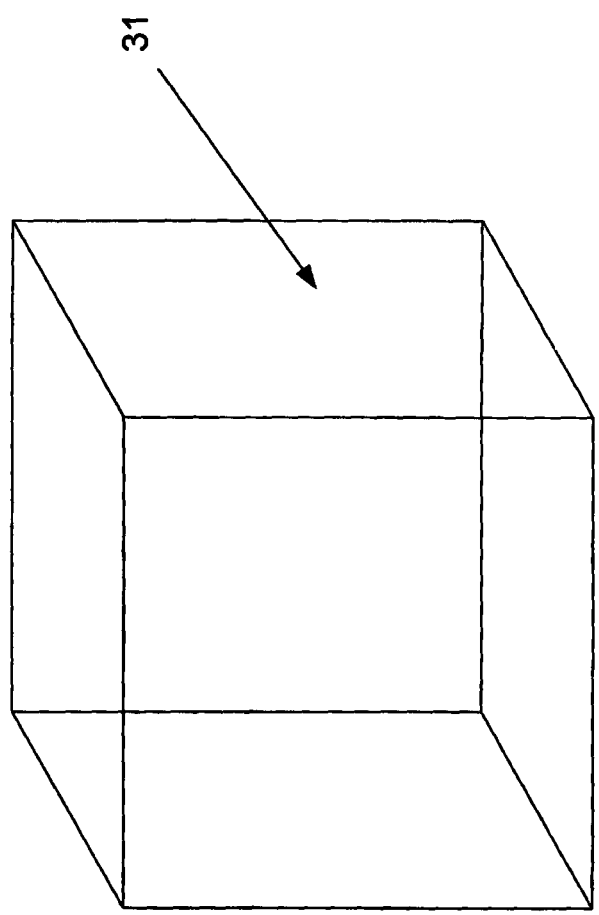
FIG. 3 Is a wireframe cube comprising a simple scene.

Referring now to FIG. 3, there is depicted a wireframe cube 31 for rendering on the display 17 of the computer system 100. The display may be of any suitable type. For example Cathode Ray Tube (CRT), LCD (liquid crystal display) or plasma displays are non-limiting examples of the display technology that might be used by display 17. The vertices and edge data for the cube 31 are stored in a suitable data structure of the computer system as previously described.

Figure 4:
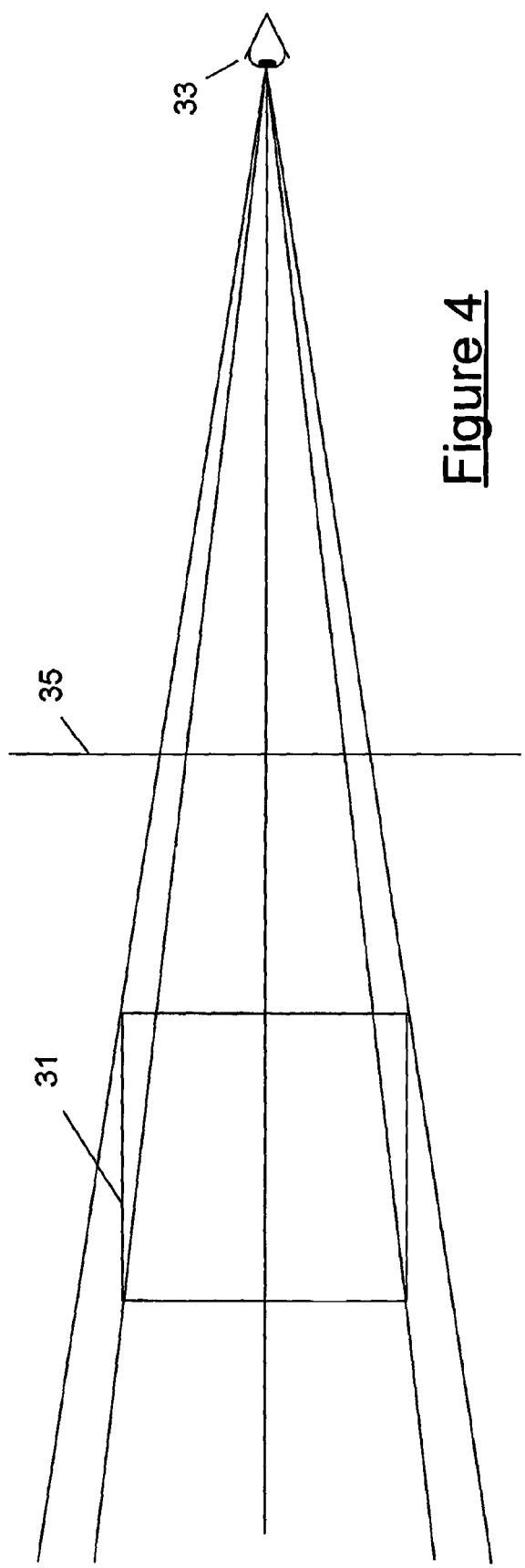
FIG. 4 Illustrates the perspective projection of the wireframe cube.

FIG. 4 represents the viewing on a display screen 35 of a 2D, single point, projection of the cube 31, shown in side view.

A number of rays from the vertices of the cube 31 to the camera point 33 are shown passing through the screen 35 to represent the transformation of the 3D vertices and edge model of the cube onto the 2D viewing surface comprising screen 35. This transformation, or as it may also be called "projection" is carried out using standard 3D to 2D perspective projections as are well known in the field of computer graphics and explained, for example, in *Computer Graphics Principles and Practice* by Foley, van Dam, Feiner & Hughes $2^{nd}$ Edition published 1990 by Addison-Wesley (ISBN 0-201-12110-7), the disclosure of which is incorporated herein in its entirety by reference.

As previously remarked, perspective transformations are computationally intensive because they involve trigonometric calculations.

Figure 5:
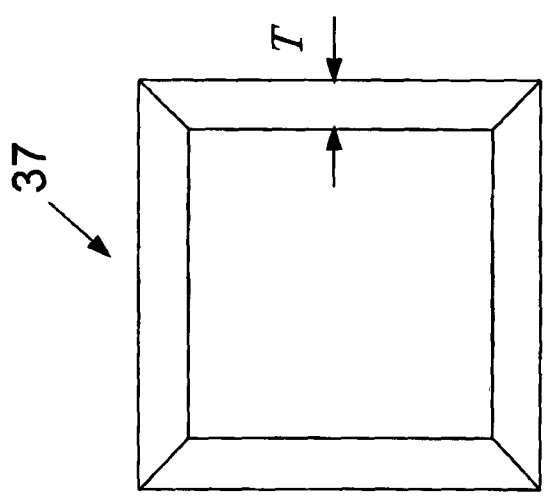
FIG. 5 Is a plan view of the perspective projection of the wireframe cube.

FIG. 5 depicts a view 37 of the cube 31 as seen from the camera point 33. Effectively this is a single point 2D perspective projection of the cube 31 onto the viewing plane 35. To visually make the cube appear 3d, the back face of the cube is shown as being significantly smaller than the front face.

It will be noticed that the projections of the rear and front faces of the projection 37 of the cube 31 are spaced a distance T apart.

FIG. 7 depicts objects present inside the cube. The objects show a difference in size as they are positioned in the front and back of the cube.

Figure 6:
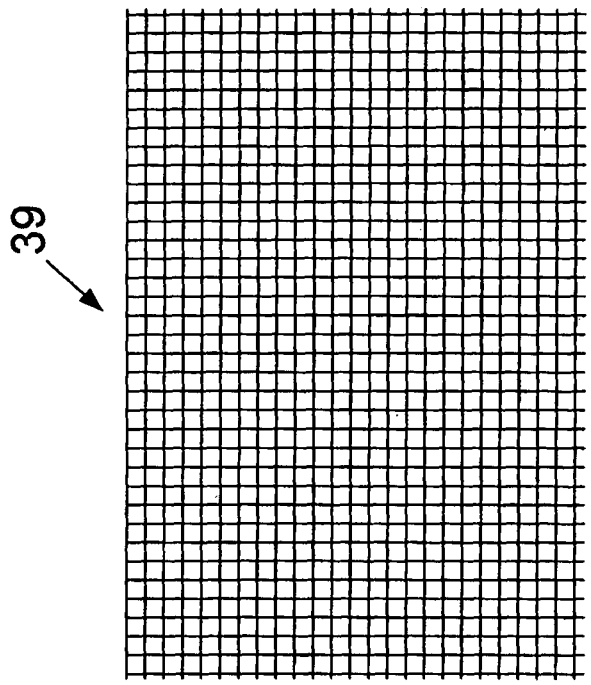
FIG. 6 Illustrates a display screen comprising a rectangular array of pixels.

In the context of a computer graphics system such as system 100 of FIG. 1, the screen 35 will typically comprise a display monitor or other display device, e.g. display 17 of FIG. 1, including a grid of pixels 39 as represented in FIG. 6.

Figure 8:
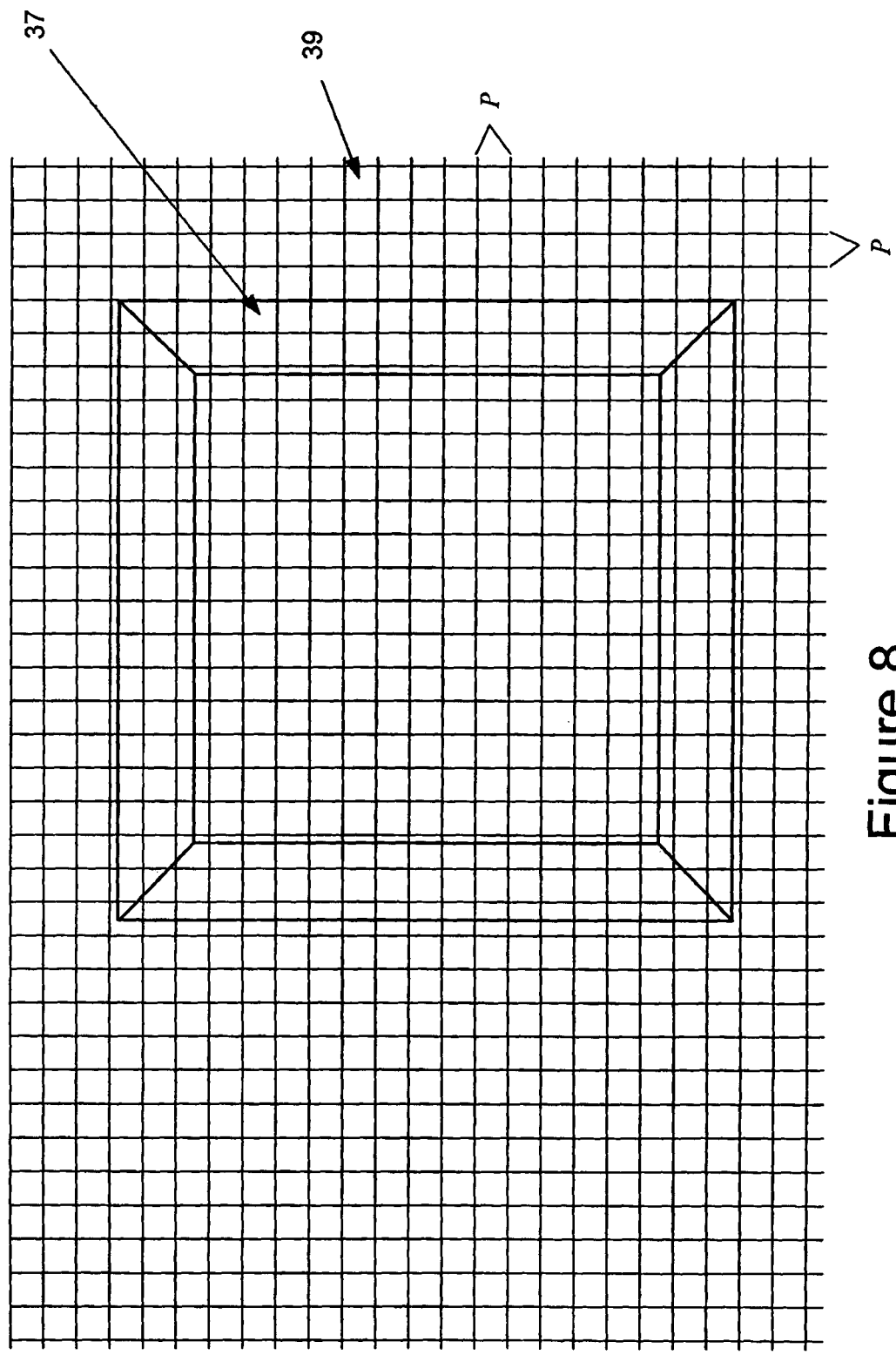
FIG. 8 Illustrates the perspective projection of FIG. 6 superimposed on the rectangular array of pixels of FIG. 7.

FIG. 8 is an enlarged view of the projection 37 of the cube 31 superimposed on the pixel grid 39. The pixels making up the grid have a notional width and height p as indicated.

In order to represent the projection 37 by means of pixels of the grid 39 those pixels over which lines of the projection 37 fall are set to a contrasting color (i.e. black, as shown in the present example). The resulting pixel image is shown in FIG. 9.

Figure 9:
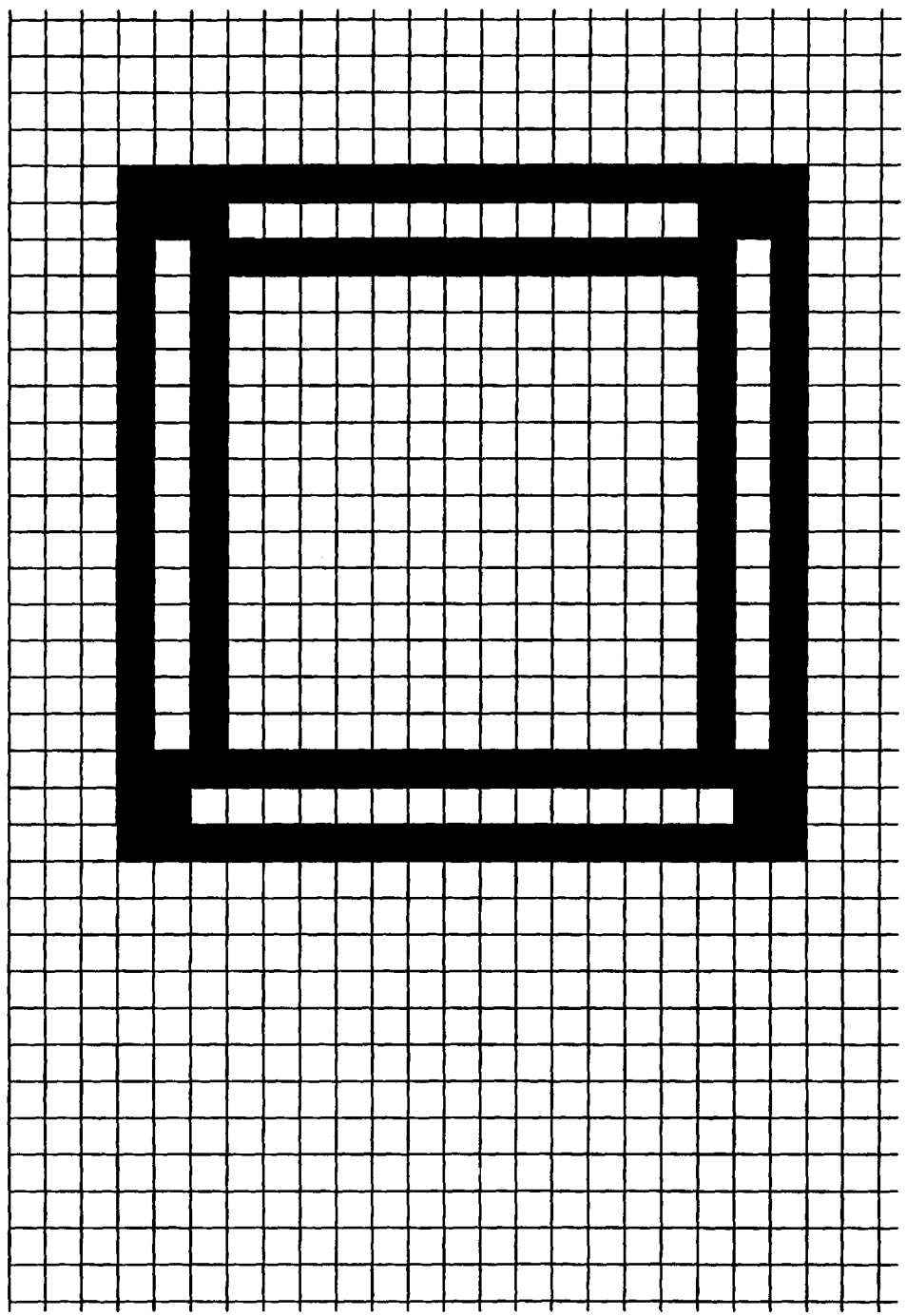
FIG. 9 Illustrates the rendering of the perspective projection of the cube by the screen of FIG. 7.

It will be noted that since the distance T of the rear and front faces of the projection 37 of the cube 31 was greater than the width of three adjacent pixels, the corresponding pixel image of FIG. 9 allows those rear and front faces to be distinguished from each other.

Figure 10:
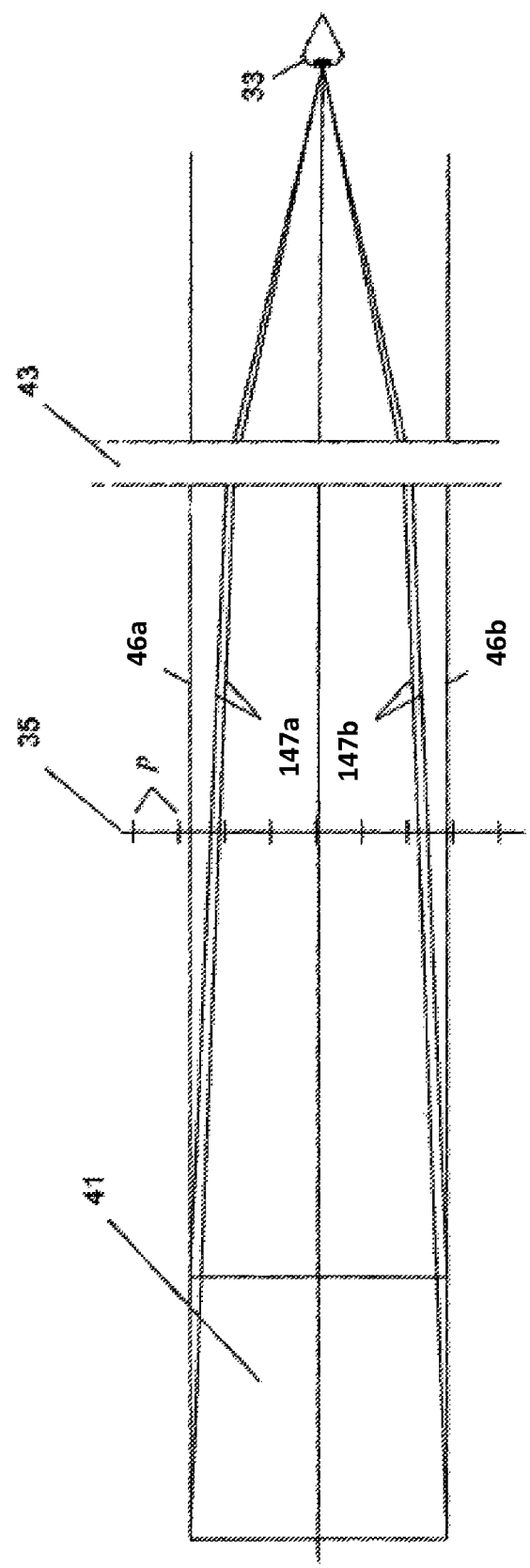
FIG. 10 Is a diagram comparing orthogonal (i.e. parallel) projection with perspective projection of the cube relative to a pixel display screen.

FIG. 10 is a somewhat similar diagram to that of FIG. 4 except that it represents the projection of a smaller 3D cube 41 (shown in plan view) onto display screen 35 for viewing from camera point 33. Since the focal length that has been used is considerably longer than for FIG. 4 there is a discontinuity in linear scale indicated by the space 43. In FIG. 10 the parallel rays 45a, 45b represent an orthogonal projection of the cube 41 onto display screen 35 whereas the pairs of converging rays 47a, 47b represent a perspective projection.

It will be noted that due to the smaller size of the cube 41 and the longer focal length used in the perspective projection, the rays 46a and 46b of the orthogonal projection and the respective paired rays 147a and 147b that are associated with the perspective projection diverge by a distance that is less than a pixel width p at the display screen 35.

Figure 11:
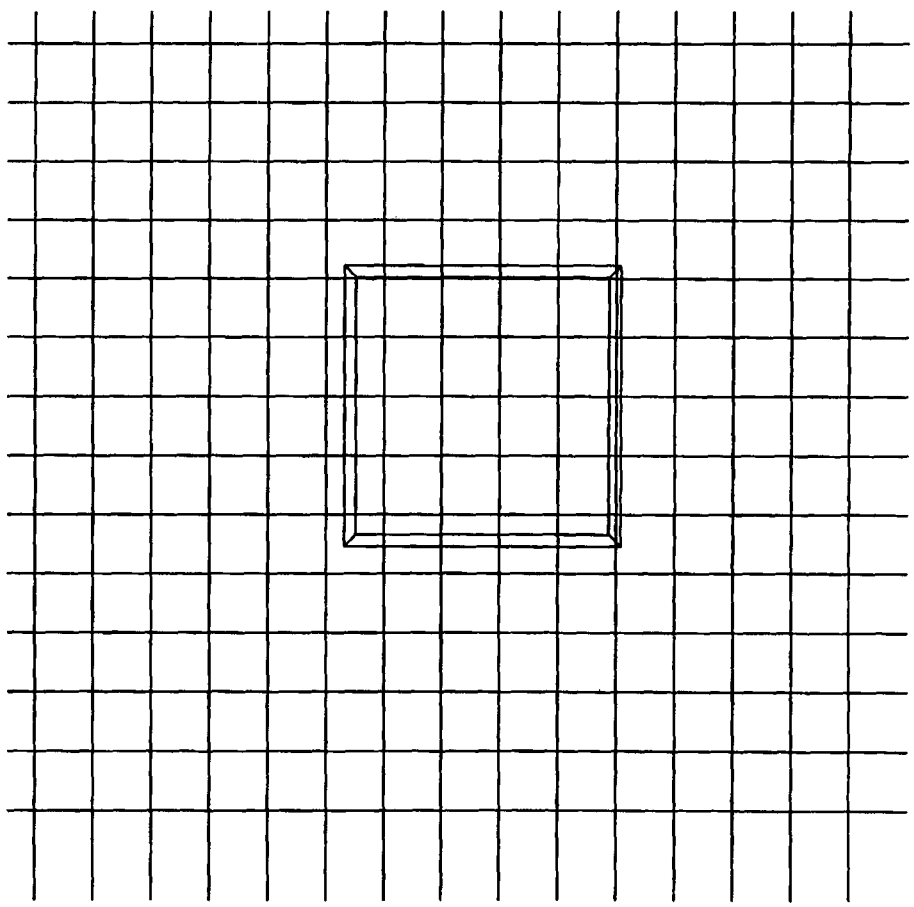
FIG. 11 Illustrates the perspective projection of the cube of FIG. 10 superimposed on the pixel display screen.

FIG. 11 is a view of the perspective projection of the cube 41 in respect of camera point 33 superimposed over the pixel grid 39 of display screen 35.

Figure 12:
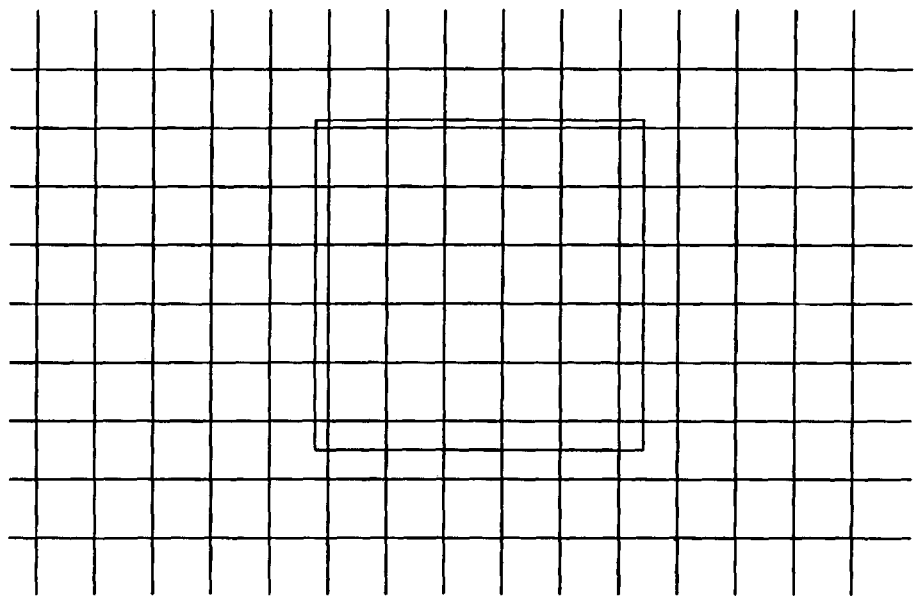
FIG. 12 Illustrates the orthogonal projection of the cube of FIG. 10 superimposed on the pixel display screen.

Similarly, FIG. 12 is a view of the orthogonal projection of the cube 41 in respect of camera point 33 superimposed over the pixel grid 39 of display screen 35.

Figure 14:
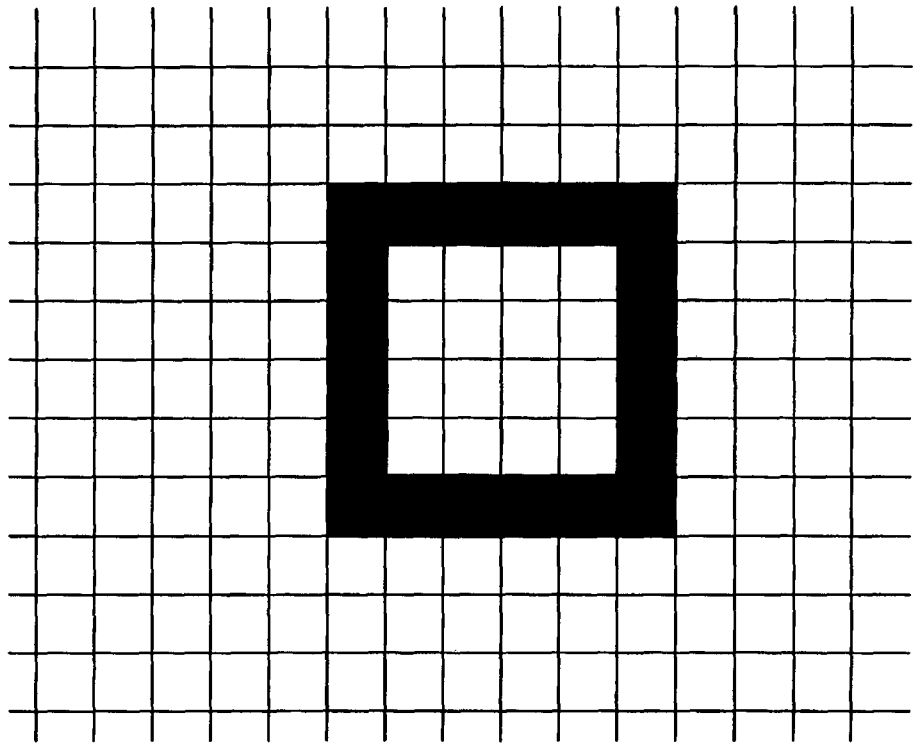
FIG. 14 Illustrates the rendering of the orthogonal projection of the cube of FIG. 10 by the pixel display screen.
Figure 13:
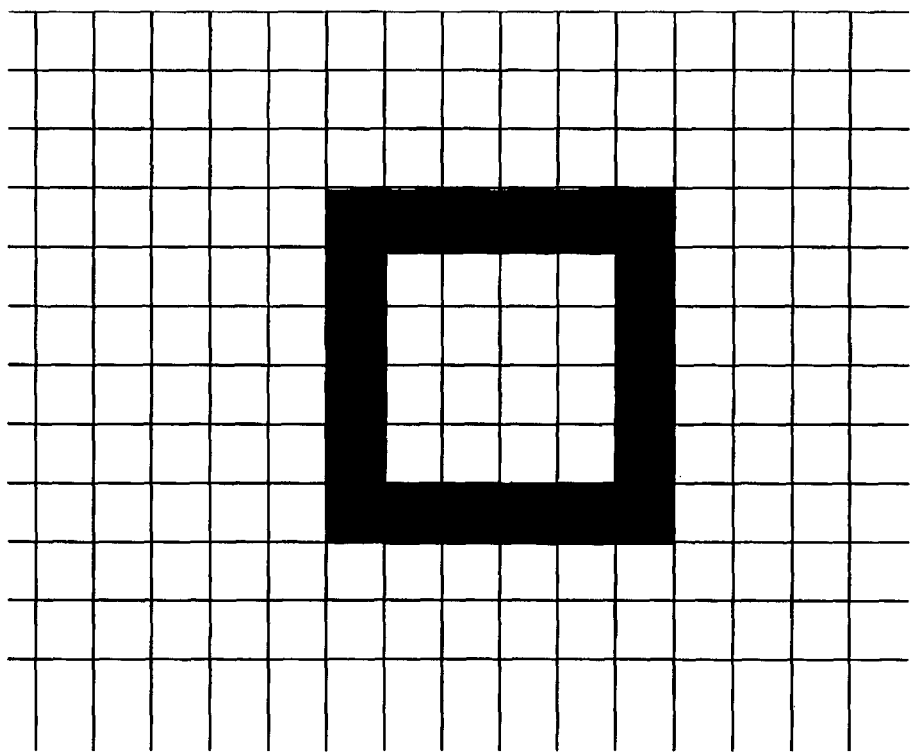
FIG. 13 Illustrates the rendering of the perspective projection of the cube of FIG. 10 by the pixel display screen.

It will be noted that the perspective projection of FIG. 11 overlays the same pixels as the orthogonal projection of FIG. 12. Consequently, the actual image that is generated on the pixel grid 39 of display screen 35, and which is seen by a user of the computer system, for example a game player, is identical for each projection as shown in FIGS. 13 and 14. This projection is considerably smaller than that shown within FIG. 9. Because of its small size, the difference between the back face and the front face is not observable and so in this diagram the cube appears to be a square.

If an object was present in this cube it would not appear to be smaller or larger depending on weather it was in the front or the back of the cube.

Technically there should always be a difference between the front and back face, but as computer monitors are grids of pixels, such a difference is too small to exist when that difference is below one pixel in size. Normally 3d calculations use perspective, but as there is no size difference between the front and back face, different calculations are used that do not take perspective into account.

While the above demonstration has been made using a single point projection, the inventor has found that corresponding results apply for two and three point projections as well.

It will be realised from the above discussion that, depending on the size of a 3D object to be represented, and parameters such as its distance behind the viewing plane and the focal length used, there may be no observable difference on the screen between a view of the object produced using an orthogonal projection and a view of the object produced using a perspective projection. Yet, perspective projection is much more computationally expensive than orthogonal projection, i.e. the calculation count is higher for perspective projection.

Furthermore, the wireframe cubes 31 and 41 may be thought of as bounding boxes. Consequently, if the bounding box may be rendered using an orthogonal projection as was the case with box 41, then any objects of a scene that fall within the bounding box may also be rendered using orthogonal projection.

Therefore, the inventor has found that a scene may be rendered, i.e. by activating pixels of an electronic display device, using a perspective projection in respect of those objects for which a noticeable difference would occur between rendering in perspective projection and rendering with an orthogonal projection and using an orthogonal projection for the remaining objects to thereby produce a scene which appears overall to be realistically rendered using a perspective transformation.

Furthermore, as will shortly be explained, in a preferred embodiment of a method of the invention, it is possible to generate the 2D projection of octants of a scene modelled with an Octree on the basis of the 2D projection of the overall parent octant cube rather than having to project each octant individually from 3D to 2D space.

Figure 16:
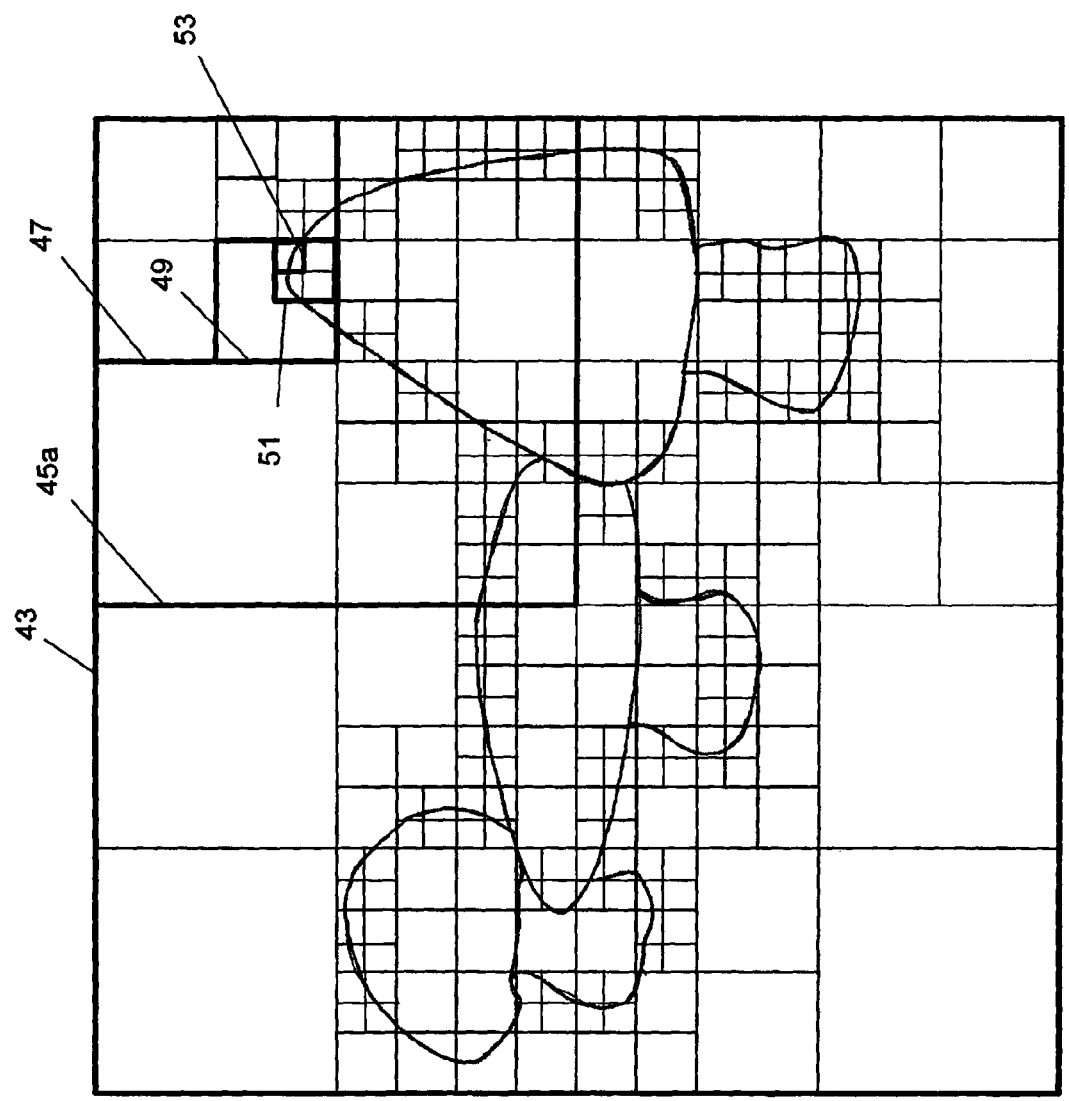
FIG. 16 Illustrates a slice through the Octree cube structure of FIG. 15 illustrating lower level generations of child octants.

FIG. 15 depicts a scene comprising three objects in the form of mushrooms superimposed within an overall Octree cube 43. The Octree cube is stored as a data structure in memory of the computer system illustrated in FIG. 1. In the interests of clarity, only the overall parent cube 43 of the Octree, which is shown in continuous line, and its first eight child octants 45a . . . 45h, shown in dashed line, are visible in FIG. 15. The scene is viewed by an eye point 157 in a viewing plane 155. Reference numeral 159 depicts a ray. However, as is known in the art of computer graphics, the Octree child cubes continue to subdivide around the portions of the objects in scene which are curved to a predetermined limit of resolution. This is illustrated in FIG. 16 which comprises a slice through the Octree of FIG. 15 and wherein a further three levels of octants, 49, 51 and 53 can be seen.

A method according to a preferred embodiment of the present invention will now be described with reference to FIG. 17 to FIG. 23.

Figure 17:
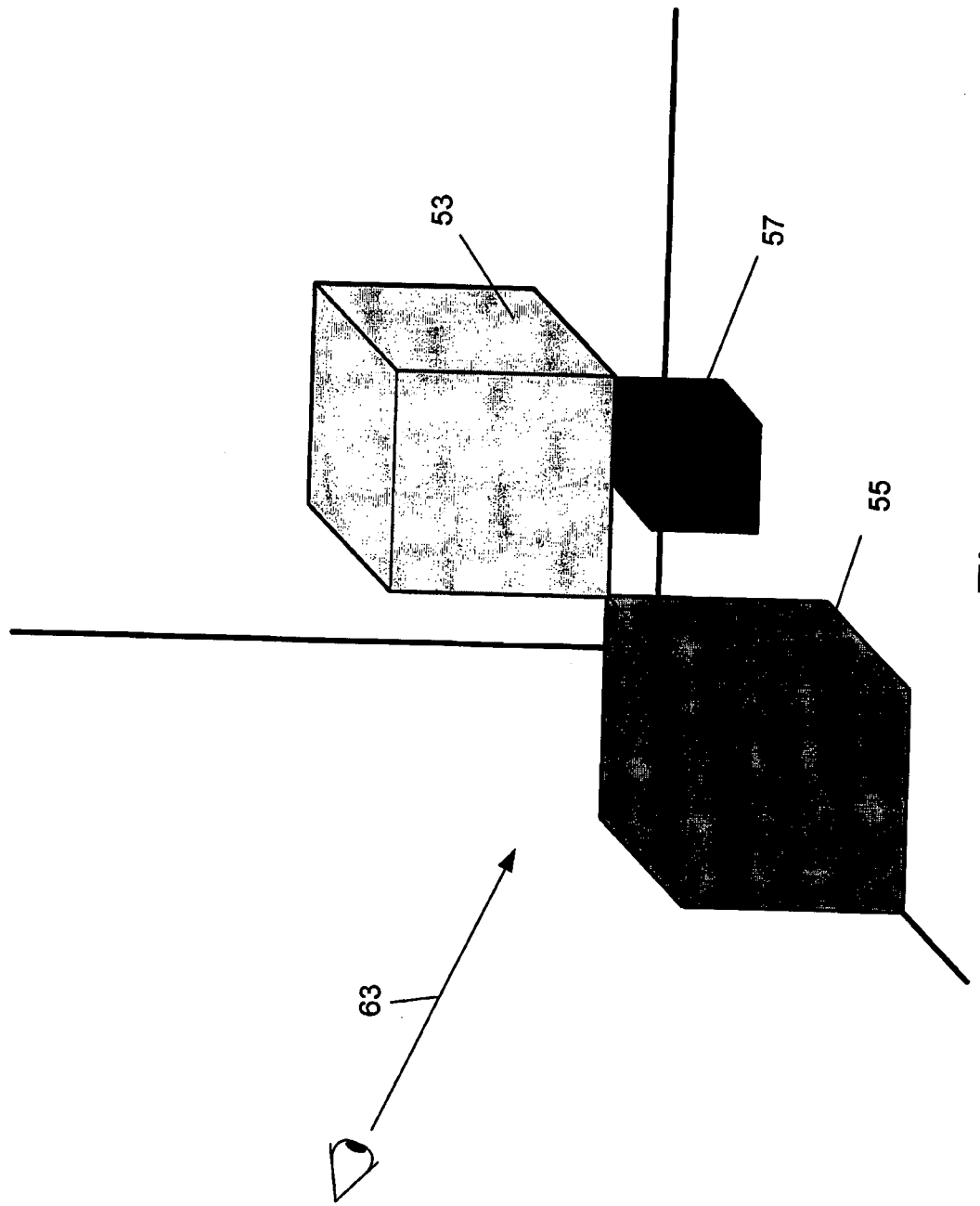
FIG. 17 Depicts a simple three dimensional (3D) scene for rendering according to an embodiment of the present invention.

FIG. 17 depicts a scene comprising three very simple objects in the form of three 3D cubes 55, 57 and 59. For the purposes of the present explanation it is desired to operate the computer system of FIG. 1 to display a 2D representation of the scene of FIG. 17 along the viewing angle 63 indicated in FIG. 17.

Figure 18:
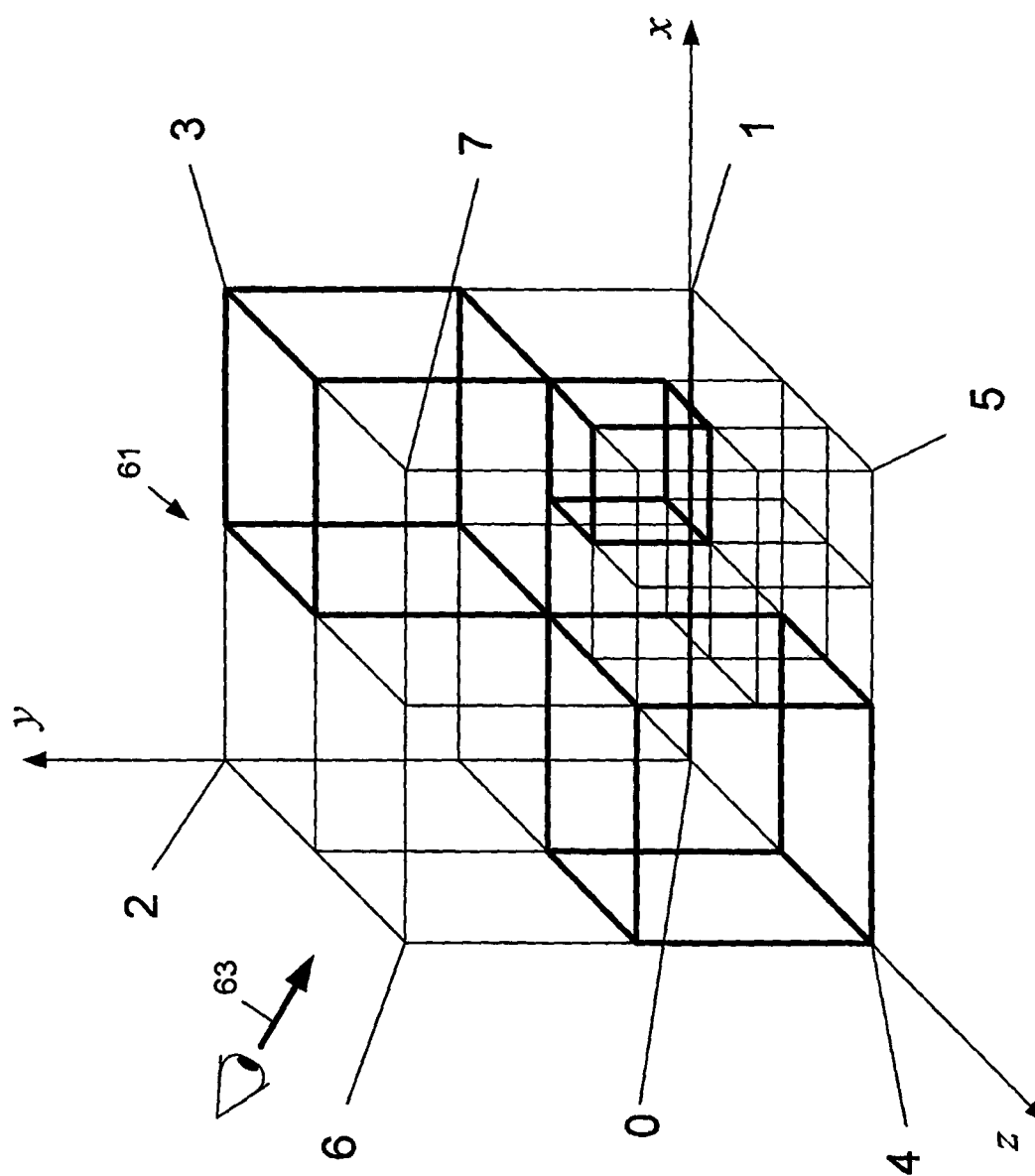
FIG. 18 Depicts a subdivided Octree cube corresponding to the scene of FIG. 17.

FIG. 18 depicts an overall Octree cube 61 that is subdivided into octants for modelling the scene of FIG. 15. For the purposes of the present explanation it is assumed that the overall dimensions of the Octree cube 61 are such that, as explained in relation to cube 41 of FIG. 10, no discernible difference will be noticed if an orthogonal projection is applied rather than a perspective projection.

The overall Octree cube 61 has been subdivided into eight first level child cubes which are numbered 0 to 7. Cube 5 has in turn been subdivided into eight second level child cubes. First level child cubes 3 and 4 and second level child cube 3 of first level child cube 5 model cubes 55, 57 and 59 of the scene that is shown in FIG. 17.

Figure 19:
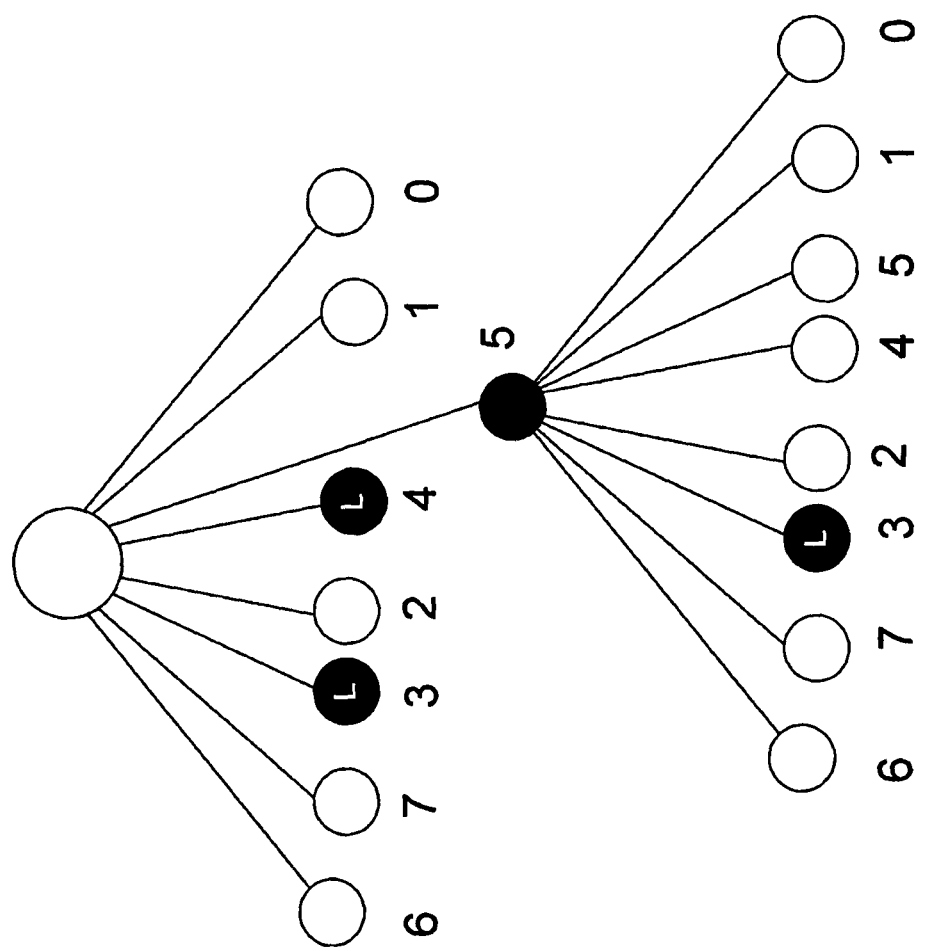
FIG. 19 Is a node diagram of an Octree data structure corresponding to the Octree cube of FIG. 18.

The Octree cube 61 is stored in the memory of the computer system of FIG. 1 in a data structure comprising the Octree shown in FIG. 19.

In order to display the scene of FIG. 17 the nodes of the Octree are read, that is traversed, in Front to Back order relative to the viewing angle 63.

A major operation associated with occlusion culling is finding the dimensions of a bounding box. In an Octree based system, this normally involves collecting the 8 values of an encompassing cube, converting those values from 3D world space to 3D screen space and then sorting those values to determine the horizontal and vertical minimum and maximum values. This is a significant amount of work in a perspective based system as it would normally be calculated for every box. As mentioned earlier, the presently described method according to a preferred embodiment of the invention takes advantage of the concept of breaking up the world/object into smaller orthogonal zones. Using these zones to find the bounding box dimensions can be replaced by halving the horizontal and vertical edges because the orthogonal zone bounding boxes are exactly one quarter of the size of their parents when dealing with Octree data.

As is known in the art of computer graphics, there are eight different viewing sectors from which an Octree may be viewed and tables of the order of traversing the octrees for front to back viewing can be devised depending on the sector in which the viewing angle fall. For the situation illustrated in FIG. 16, wherein the view point is located in sector +x, +y, +z, the order for traversing the Octree for front to back viewing is "7, 6, 5, 3, 4, 2, 1, 0".

Figure 20:
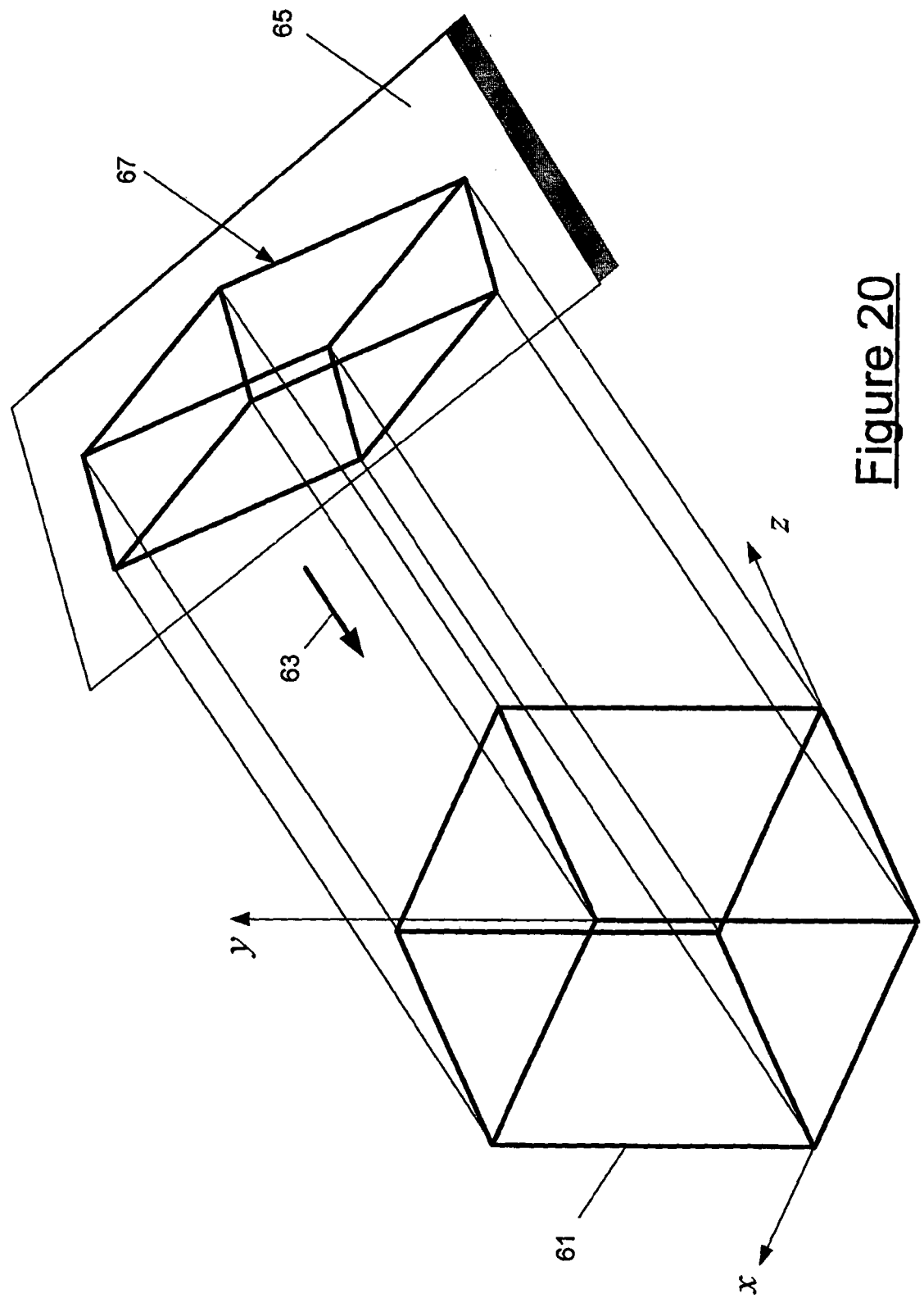
FIG. 20 Illustrates the 3D to 2D orthogonal projection of the highest level cube of the Octree cube of FIG. 18.
Figure 21:
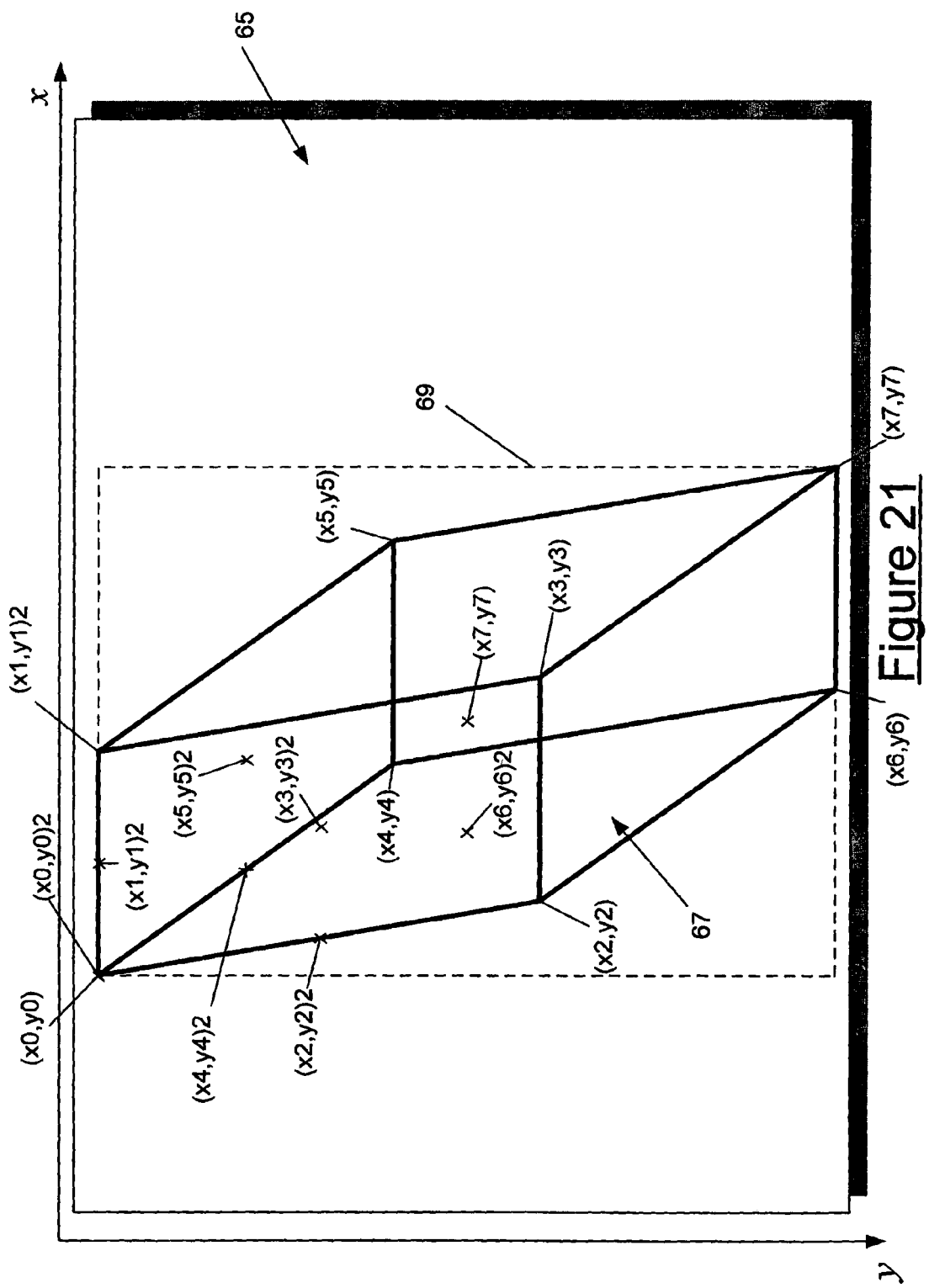
FIG. 21 Illustrates the orthogonal projection of the cube of FIG. 18.
Figure 22:
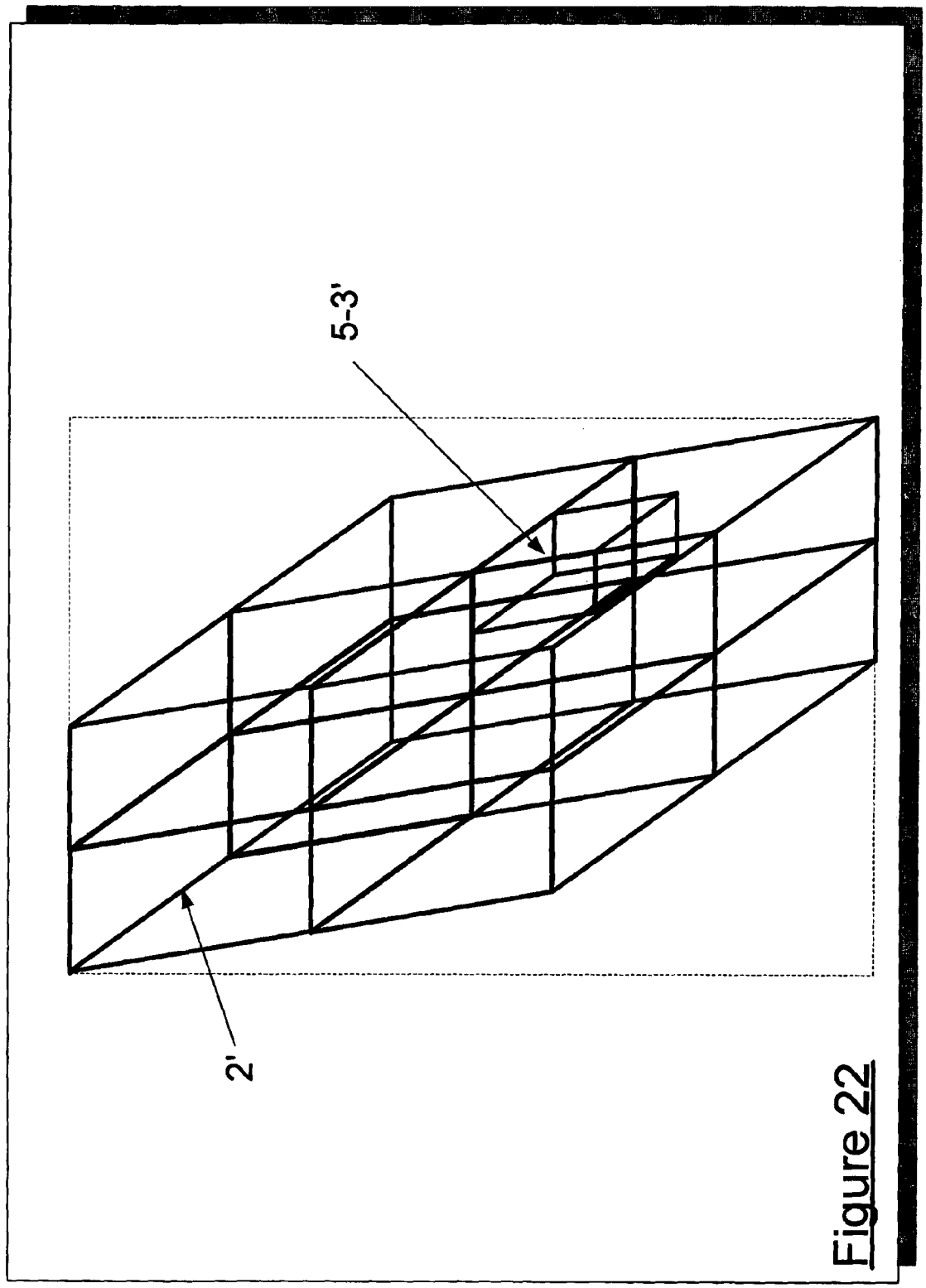
FIG. 22 Is a diagram used to illustrate how the projection of child cubes of the Octant can be derived from the vertices defining the projection of the higher level cube using 2D to 2D manipulations without recourse to 3D to 2D projections.

Referring now to FIG. 20, the overall Octree cube 61 which is defined by eight 3D vertex coordinates P0(x0,y0, z0), . . . , P7(x7,y7,z7) is orthogonally projected onto a desired viewing plane 65 at the viewing angle 63 to thereby generate a 2D projection 67 of the cube comprising eight 2D vertex points P(x0,y0), . . . , P(x7,y7). With reference to FIG. 21, the eight 2D vertex points P(x0,y0), . . . , P(x7,y7) defining the vertices of this 2D projection may be termed a "form pattern" since they define the shape of the projection of the Octree. Furthermore, since the projection is orthogonal, they also define the shape, when scaled down, of the projections of the child octants, which would not be the case had a perspective projection been used.

In the drawing of FIG. 21 the vertices are shown interconnected by edges however these edges will not appear in the final rendering of the scene of FIG. 17. The form pattern vertices $P_0(x0,y0)$, . . . , $P_7(x7,y7)$ are stored in an array in the same order as the viewing order for the Octree, i.e. FPArray=[$P_7$, $P_6$, $P_5$, $P_3$, $P_4$, $P_2$, $P_1$, $P_0$].

The Octree of FIG. 19 is then read in the Front-to-Back order, which for the view point shown in FIG. 18 is 7, 6, 5, 3, 4, 2, 1, 0.

Since node 7 is empty no action is taken.
Since node 6 is empty no action is taken.
Since node 5 points to a child node the procedure drills down to the next level.
At the next level:
Since node 7 is empty no action is taken.
Since node 6 is empty no action is taken.
Since node 5 is empty no action is taken.
Since node 3 is a leaf node a Leaf Node Subroutine is called for child node 3 of child node 5. The Leaf Node Subroutine will be described shortly.
Since node 4 is empty no action is taken.
Since node 2 is empty no action is taken.
Since node 1 is empty no action is taken.
Since node 0 is empty no action is taken, the procedure then jumps up one level.
Since node 3 is a leaf node the Leaf Node Subroutine is called for child node 3.
Since node 4 is a leaf node the Leaf Node Subroutine is called for child node 4.
Since node 2 is empty no action is taken.
Since node 1 is empty no action is taken.
Since node 0 is empty no action is taken.

The Leaf Node Subroutine is passed the Form Pattern array, the MinPoint and MaxPoint of the bounding box and the Leaf Node information.

The top left hand corner of the bounding box (which in the present case coincides with vertex (x0,y0) of the projection 67 of Octree cube 61, is used as an origin point for the eight vertex points (x0,y0), . . . , (x7,y7).

Figure 23:
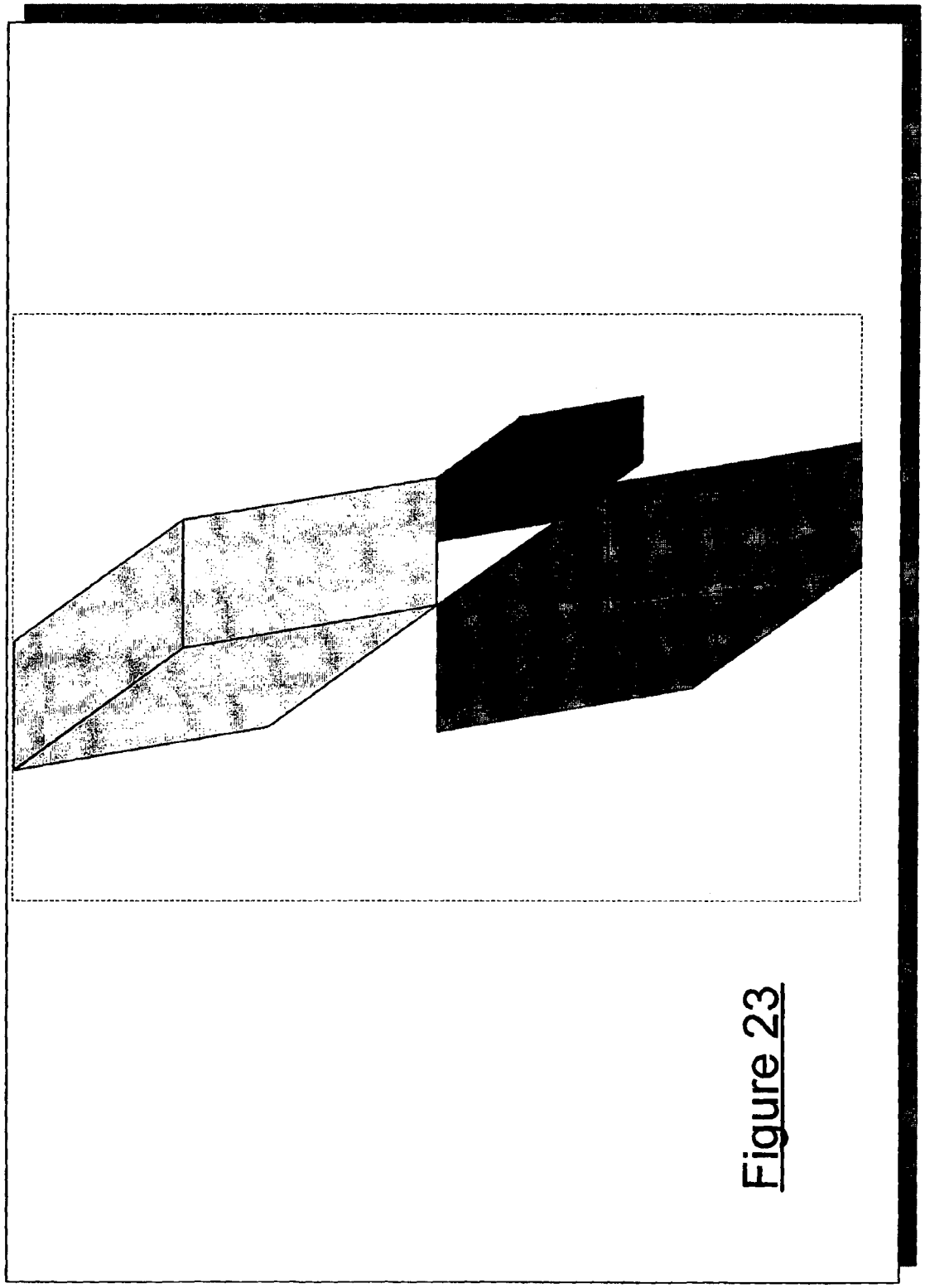
FIG. 23 Depicts the rendering of the scene of FIG. 17.

The Leaf Node Subroutine then operates on the eight vertex points (x0,y0), . . . , (x7,y7) to halve them to produce eight points (x0,y0)2, . . . , (x7,y7)2 as indicated on FIG. 19. The eight vertex points (x0,y0)2, . . . , (x7,y7)2 define the 2D projection of Octant 2 of the Octree cube of FIG. 18 as indicated as 2' in FIG. 22. It will be noted that this projection has been attained by dividing the points defining the vertices of the 2D projection of the overall Octant cube. It was not necessary to perform a projection of the 3D vertices of Octant 2 into the viewing plane. Consequently, these eight points (x0,y0)2, . . . , (x7,y7)2 are offsets from the minimum of the bounding box 69. A bit shift operation is used to halve the values of eight vertex points (x0,y0), . . . , (x7,y7) relative to the minimum of the bounding box 69. Each of the new points (x0,y0)2, . . . , (x7,y7)2 are then halved again to produce a further eight sub-points e.g. (x0,y,0)3, ..., (x7,y7)3 for each octant of the next level down. For example, as indicated by child octant cube projection 5-3' in FIG. 22.

Where the Octree indicates that the child Octants are leaf nodes then they are shaded as shown in FIG. 23 to produce a rendering of the scene that was originally depicted in FIG. 17, Provided that the dimensions of the objects, e.g. the cubes of FIG. 23, are sufficiently small, then there will be no discernible difference between them being rendered using the orthogonal projection or using a perspective projection transformation for reasons previously discussed in relation to FIG. 1 to FIG. 13.

If the form pattern method were not connected to Octree data with terminating branches, the method would render a solid cube of floating points. By connecting it to Octree data and the unfolding of the pattern when branches are empty, it in effect, to use an analogy, carves the form pattern as though it were plaster. The end object has all the same characteristics and form of an object that has been made using the conventional technique of using voxels with 3D to 2D algorithms, but in terms of processing power the form pattern technique uses a fraction of the time and operations.

The shape of the projection of the parent cube defined by the 2D orthogonal projection points (x0,y0), ..., (x7,y7) can be termed a "form pattern" because it defines the proportions, i.e. the form, of the orthogonal projections of not only the highest level parent octant but also the descending levels of child octants. There are a number of variations of the form pattern that could be implemented.

Figure 24:
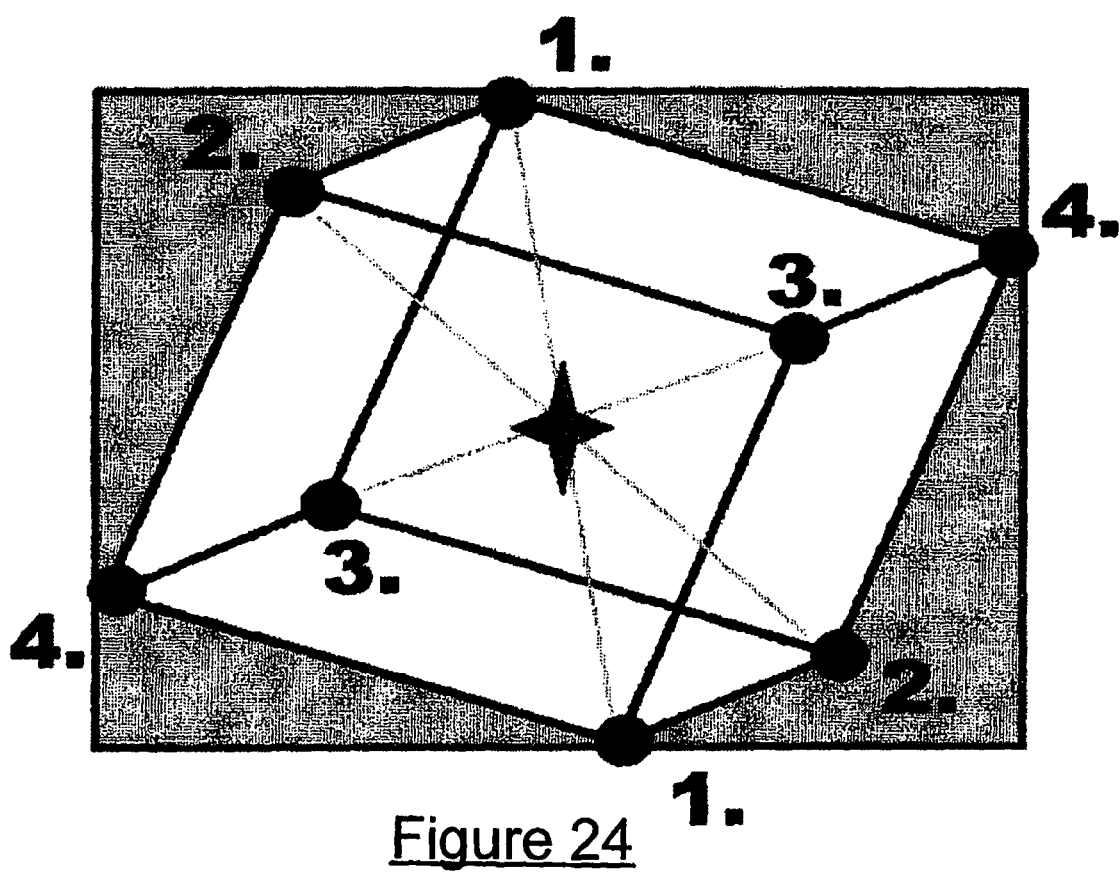
FIG. 24 illustrates an alternative method for calculating vertices of the 2D projection of a cube in orthogonal mode.

For example the vertices are usually stored as eight "x" values and eight "y" values, e.g. (x0,y0), ..., (x7,y7) as described above. However, it is also possible to collect four "x" values and four "y" values and generate the remaining values by turning the collected values into offsets from a centre point that was generated by either 2-dimensionally projecting the 3 dimensional centre point of the cube that is being operated upon or by using the 2D centre point of the aforementioned bounding box (e.g. box 69 of FIG. 21). Once these offsets have been collected some points can be generated by reversing the sign of the values. By collecting half of the discussed corner values appropriately the remaining values can be generated by use of this method. This method of creating points by sign reversal is only accurate with a cube or prism that is orthogonally projected as illustrated in FIG. 24.

Figure 25:
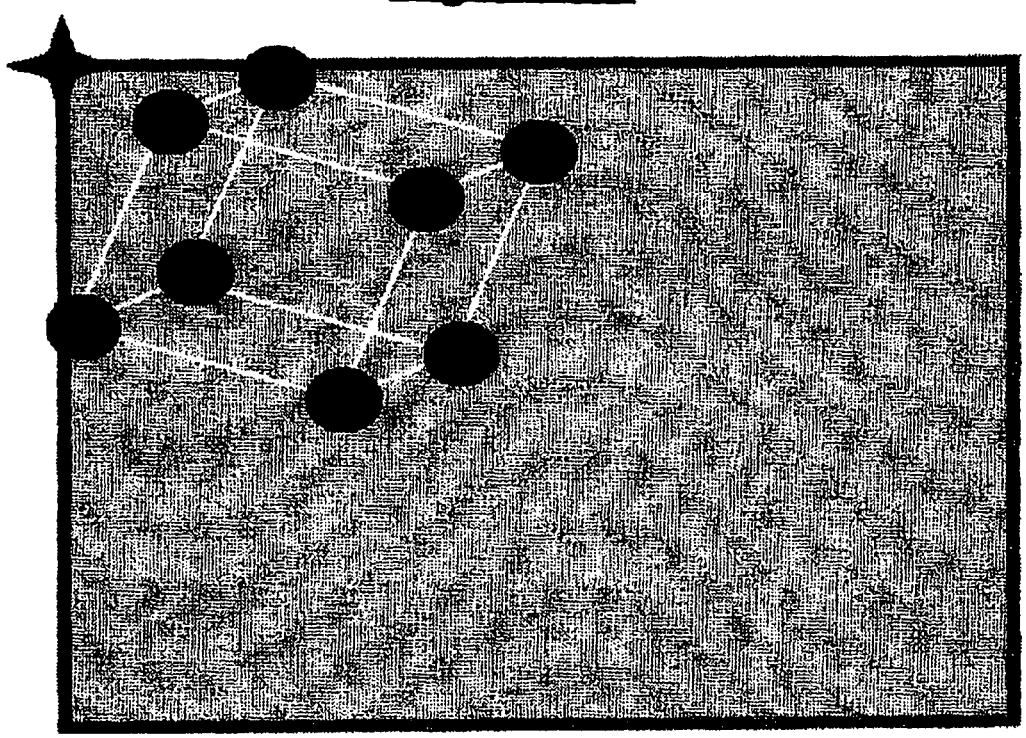
FIG. 25 Illustrates how vertices of the 2D projection of a cube may be calculated as offsets from an origin of the display screen.

The form pattern will usually be offsets in relation to one of the four corners of the bounding box 19. Alternatively, they could be an offset from any point within the bounding box or outside of the confines of the bounding box, they could also have no offset at all taking their values to be the unaltered values they currently hold as screen pixels. However, the use of one of the bounding box's four corners is considered to carry benefits of understanding and comprehension and as such the top left hand corner (indicated as "Min" in FIG. 21) coincide with the practice of treating the top left hand corner of the screen as position (0,0) as illustrated in FIG. 25.

One of the most processor intensive parts of rendering 3D graphics is the conversion of points from a 3D world to 2D screen. Normally this process consists of a significant number of mathematical operations. The process of halving the form pattern and adding those halves to the form pattern points of the parent form pattern points gives an identical output to normal 3D to 2D conversion.

In the preferred embodiment, calculating the form pattern does not use multiplications, divisions or multiple complex operations. It instead replaces the whole system with a BIT SHIFT and ADD. Under the normal conditions of perspective based 3D graphics this method would not work however if the object to be rendered is divided into orthogonal subsections as described above then the system can take advantage of this unusual pattern.

Figure 26:
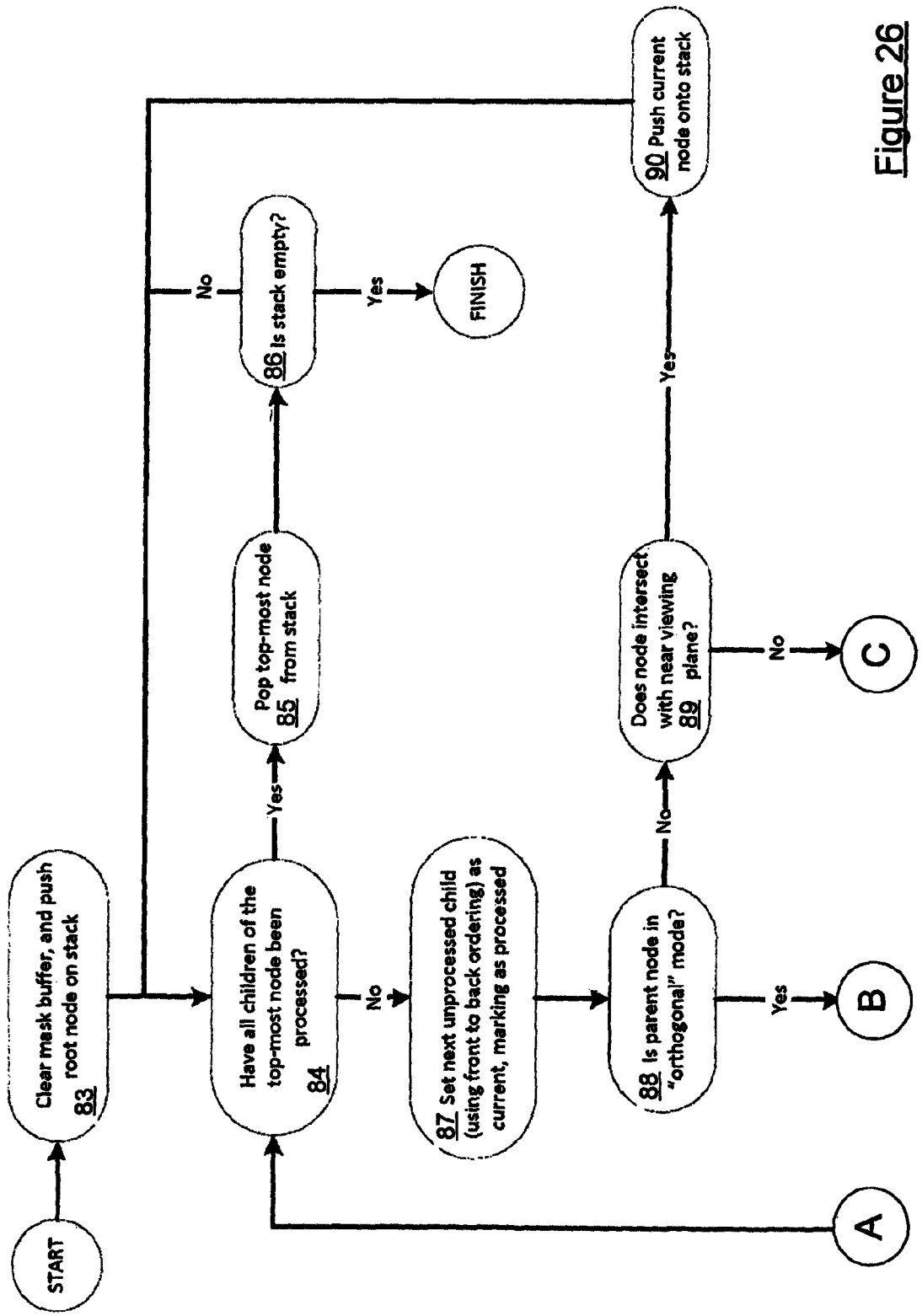
FIGS. 26 to 28 Comprise a flowchart of a method according to a preferred embodiment of the present invention.
Figure 27:
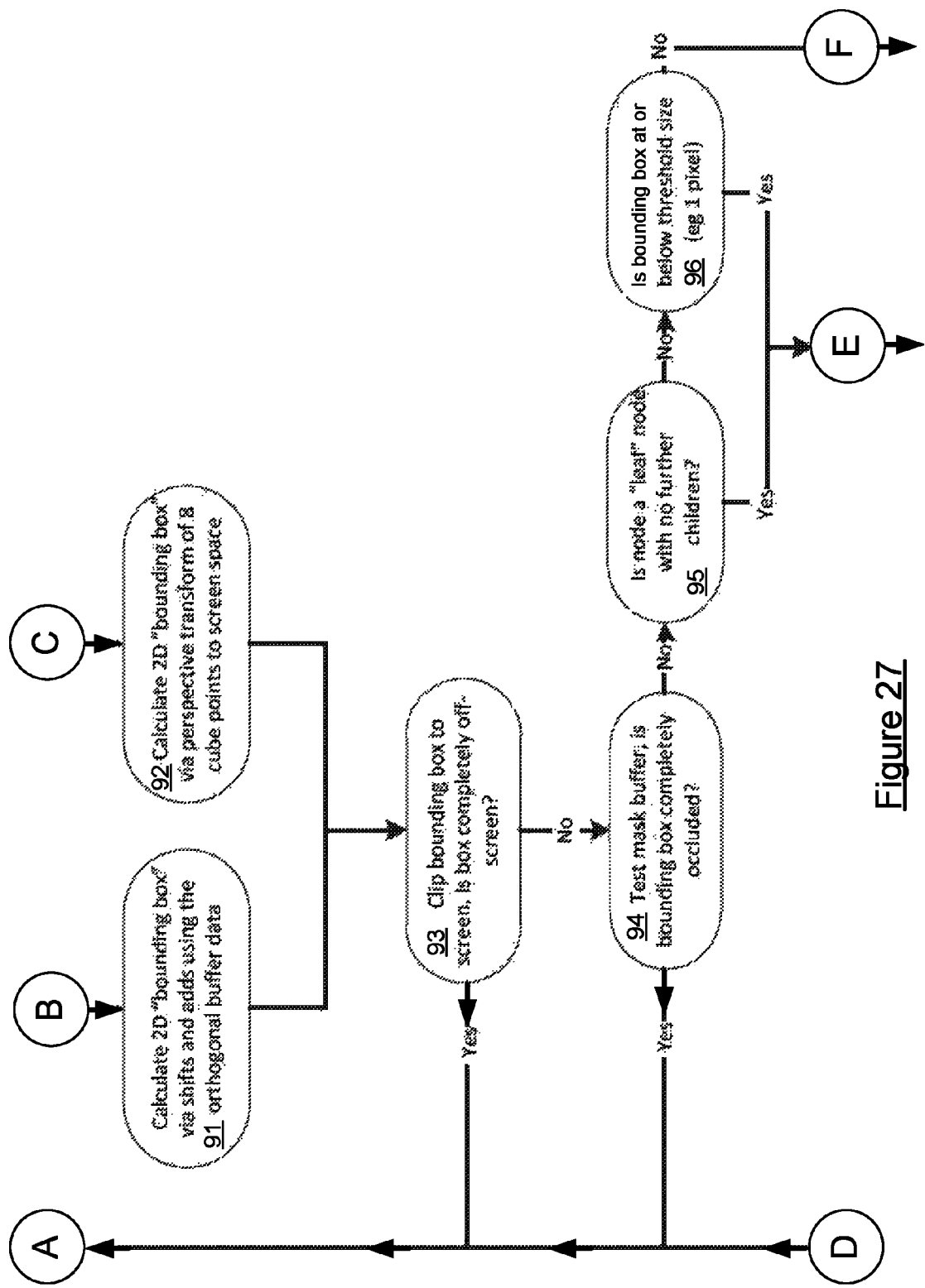
Figure 28:
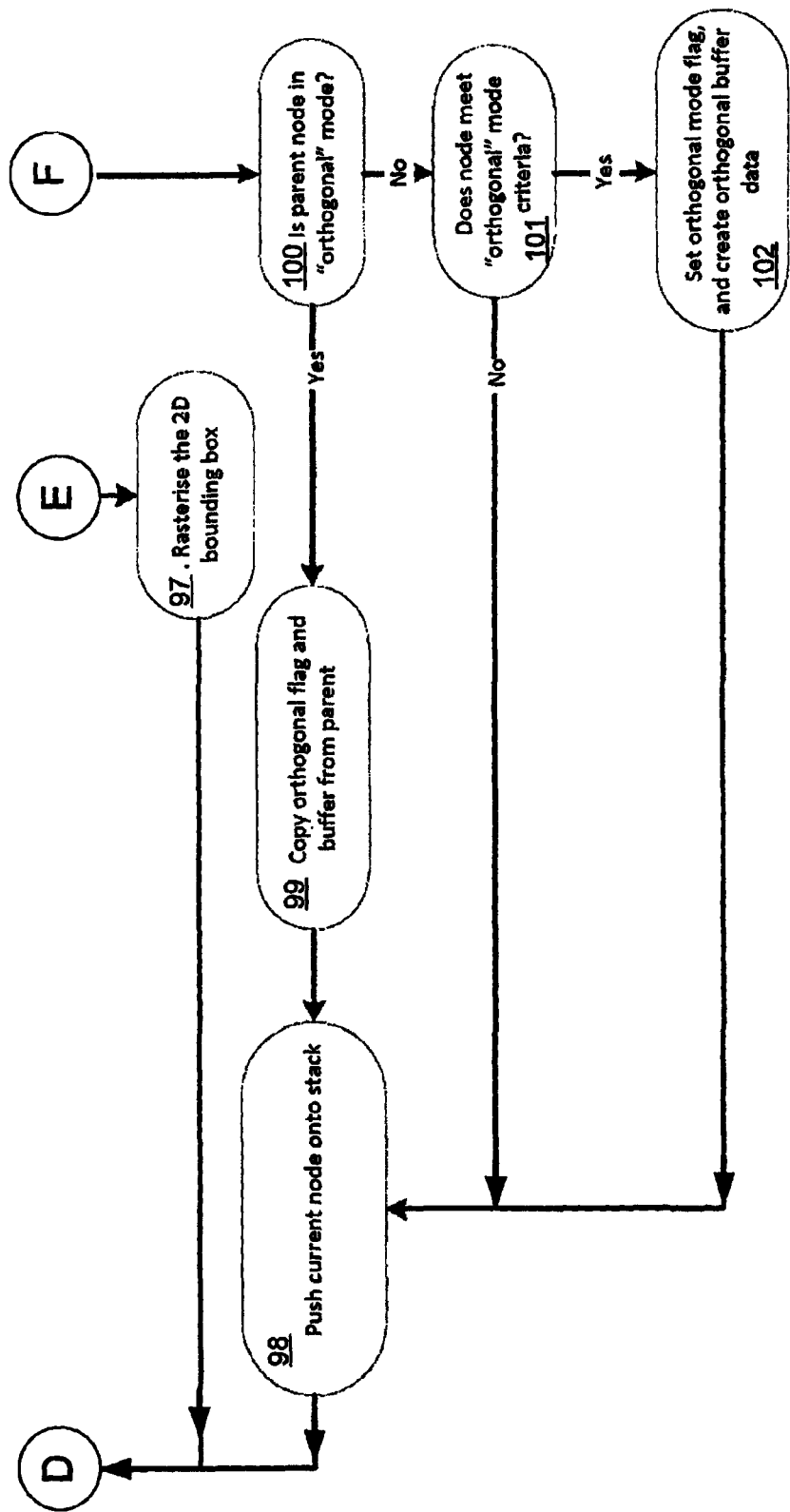

Referring now to FIG. 26 to FIG. 28, a method, according to a preferred embodiment of the present invention, for processing an Octree data structure containing data modelling a scene for rendering, is set out in flowchart form. This method may be coded as tangible, computer readable instructions, for example upon optical disk 27 of FIG. 1 so that it thereby constitutes a computer software product 29 for processing by the computer system 100.

The various processes that are performed at each box in the flowchart of FIGS. 26 to 28 will now be discussed.

At box 83, the mask buffer is cleared to zeros. The mask buffer is a series of flags, one for each pixel in the display buffer, that indicate whether a pixel has been written to that location. By virtue of the front to back ordering provided by the algorithm, each pixel need only be written to once. The mask buffer is used to disregard a node, and all its children, when all the pixels overlapping the node's 2D bounding box have already been written to.

At box 84, each node may have from 0 to 8 children; once all the children present on a node have been processed the node is popped from the stack and no longer considered.

At box 85, for a recursive implementation, popping the top-most node from the stack is performed by simply returning from the function. In an iterative implementation the size of the stack is reduced by one.

At box 86, when no more nodes remain on the stack the entire model has been processed.

At box 87, the children are processed in front to back order, with each one being marked as processed to determine when the node can be discarded (see box 84).

At box 88, the parent node is marked as being orthogonal mode once it or any of its parents met the criteria for orthogonal mode, see boxes 101 and 102.

At box 89, nodes that intersect the near viewing plane must be subdivided to avoid mathematical inaccuracies.

At box 90, the current node is pushed onto the stack ensuring its children (if present) are processed next.

At box 91, in orthogonal mode, the 2D bounding box is calculated by taking the size of the 2D bounding box saved in the orthogonal buffer data and dividing it by 2 for every level of ancestry since the orthogonal data was generated. That is, the child of the node that met the orthogonal mode criteria (see box 101), will have a bounding box size of exactly one half that stored in the orthogonal data buffer. The grand-child will have a bounding box, of exactly one quarter, and so on. In practice, the size of the stack at the time the orthogonal buffer data was created can be stored in the orthogonal buffer data, and subtracted from the size of the stack giving the number of times to divide by 2. With this value the divisions are achieved with a binary shift operation which is much faster than a generic division. With the size of the bounding box calculated, the offset is calculated by selecting the box offset value based on the child number, and dividing that by 2 for every level of ancestry in exactly the same way as the size, and adding that to the bounding box position stored in the orthogonal buffer data.

At box 92, in perspective mode, the 2D bounding box is calculated using the standard means of performing a full perspective transform on the 8 corner points of the current node's 3D bounding box, to screen space. Generally this is a 4×4 matrix by 3d vector multiplication yielding a 4d vector (x,y,z,w) whose w component is used as a divisor to perform the final perspective transformation. It will be realised that a system according to a preferred embodiment of the present invention is designed to avoid this step as much as possible.

At box 93, once a 2D bounding box has been calculated, test to see if it overlaps any of the screen edges and if so adjust the coordinates accordingly to reflect only the portion of the box that overlaps the display buffer. If the bounding box is completely outside the display buffer, then the node is no longer considered and control proceeds to box 84 to process the remaining children of the node.

At box 94, by virtue of the front to back drawing order, once all the pixels within any node's bounding box have been written, that node is occluded and is no longer considered. This test is achieved by testing each of the flags in the mask buffer that correspond to the area of the bounding box, if all pixels are marked as written to then the node can be discarded and control proceeds to box 84.

At box 95, if a node has no children at this point in the process, then the node is drawn (see box 97).

At box 96, if the size of the bounding box is at or below a threshold value (such as 1 pixel) then the node is drawn. This is primarily because further subdivision below the size of one pixel is unnecessary.

At box 97, to draw a node, each pixel corresponding to the clipped 2D bounding box is tested in the mask buffer and where a pixel has not already been written, the corresponding pixel in the colour buffer is set to the node's colour, and the mask buffer is set. Additionally, other buffers may be written to at this point to record information such as depth values and/or normal values.

At box 98, the current node is pushed onto the stack ensuring its children are processed next.

At box 99, once a node meets the criteria for orthogonal mode, all of that node's children are also implicitly orthogonal, so at this point the flag and the orthogonal buffer data are copied to propagate the orthogonal mode to the children.

At box 100, the orthogonal mode flag is set in the node if any of its ancestors met the orthogonal mode criteria.

At box 101, the criteria for orthogonal mode is tested. As has been previously discussed in relation FIGS. 3 to 15, in qualitative terms the criteria is that when projecting the box into screen-space with perspective, the amount that the back of the box appears smaller than the front of the box (due to perspective effect) is less than 1 pixel and thus is unnoticeable when rasterising. There are many ways to test this, but since the perspective effect is applied by dividing the vector by w (as discussed in relation to box 92), testing the ratio of w values between a transformed point at the front of the box and a transformed point at the back of the box is a convenient and simple test. The actual threshold ratio varies depending on the focal length and the dimensions of the display buffer, so it must be re-calculated whenever any of these parameters change.

Consequently, there are two parts to monitoring and implementing orthogonal mode as follows:

The first part involves pre-calculating the optimal threshold (updated whenever display size or focal-length (field-of-view) changes), and the second part involves applying the threshold during the render.

As mentioned above, the underlying logic is simple; we wish to know when the projected front and back coordinates are <1.0 pixels apart (or other similar tolerable value).

While there may be a way to calculate this value outright, at present a binary search is used. A standard binary search is performed between nearZ and farZ, transforming the point pair nearPoint=(1,1,1) and farPoint=(1,1,−1) adding (0,0, midZ), where midZ is simply the value midway between nearZ and farZ.

If the delta of projected X,Y is less than the pixel threshold then the threshold point has been located.

Using the transformed points from the binary search (which are X,Y,Z,W), the fixedWRatio=nearW/farW is then calculated.

The 8 transformed box points (X,Y,Z,W for each) are then calculated during perspective mode rendering.

The bounding box is then determined by calculating the X,Y,W Min and Max. (note the W here)

The current W Ratio is then calculated as curWRatio=minW/maxW if (curWRatio>=fixedWRatio) then orthogonal mode is entered.

It will be realised that since 1/w is often calculated as part of the perspective transform, it is possible to replace the divide with multiply by the reciprocal, which is a common floating point optimization.

It will also be noted that this method is somewhat different from the classic one of comparing delta x,y for a pixel threshold of say 24 (also calculated by binary search or trial and error.)

The method discussed above is superior in that it allows the octree node to enter orthogonal mode as soon as possible regardless of the relative orientation of the node to the screen. Otherwise the bounding box of a rotated node could bias the threshold test by up to 40% (i.e. sqrt(2)) thereby delaying entry to orthogonal mode until further subdivided.

It will be appreciated that this method also makes sense in that although the effect of projection is bounding boxes of smaller size, the cause is the x/w y/w, i.e. the relative ratio of w causing perspective to foreshorten the x,y values. Thus testing w is more logical and more accurate.

Other metrics by which the criteria can be measured include the length of one side of the cube in screen space, or the diameter of a sphere enclosing the cube in screen space.

At box 102, the orthogonal buffer data consists of the node's depth/level down the Octree (indicated by the current length of the stack), the 2D bounding box of the node, and the 8 transformed screen space points as offsets from the top left corner of the 2D bounding box.

In summary, orthogonal mode operates on nodes of the Octree data structure by dividing them and tracing the course of content containing cubes. The orthogonal mode procedure is able to bypass 3D to 2D transformations and instead scale, for example by recursively halving, a set of 2D points, i.e. a "form pattern" representing the projection of a higher level Octant in order to arrive at a corresponding set of points to represent the projection of a child Octant.

Since orthogonal mode is only entered in respect of octants for which there will no discernible difference between their perspective and orthogonal projections, as tested at box 88 of the procedure, a viewer of the rendered scene will perceive the scene as having been rendered using perspective transformations in totality. Although each subsection that is rendered in orthogonal mode has no internal perspective, perspective exists in the form of the relation between those subsections. So although a subsection may not get smaller near the back internally the entire subsection is the appropriate size as far as its relation to the viewer is concerned.

The combination of all these different sized subsections produces a 3D image with perspective that is similar in appearance to such an image produced by more mathematically intense 3D systems but with considerably fewer operations.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims, unless the context requires otherwise, the term "substantially" or "about" will be understood to not be limited to the value for the range qualified by the terms.

The invention claimed is:

1. A computer graphics method implemented upon an electronic processor based system having at least one processor arranged to control an electronic display device, said method comprising the steps of operating said processor to:
   extract data defining a three-dimensional scene from a data structure;
   create a three dimensional bounding box for enclosing one or more portions of the scene;
   project the three dimensional bounding box onto a screen space with perspective;
   calculate if a back or rear face of the bounding box perspective projected on the screen space appears is smaller than a front face of the bounding box perspective by less than one pixel and deem said portions to have satisfied a predetermined condition and,
   render said portions of the scene according to an orthogonal projection upon the electronic display device; and
   render extracted data corresponding to other portions of the scene that do not satisfy the predetermined condition according to a perspective projection upon the electronic display device;
   wherein the rendered scene displayed upon said display device appears to have been entirely rendered according to the perspective projection, whereby a count of calculations performed by the electronic processor for rendering the scene is reduced relative to rendering using only the perspective projection.

2. A method according to claim 1, including:
   projecting 3D points associated with the portions of the scene satisfying the predetermined condition from 3D to 2D to produce a 2D form pattern; and
   determining projections of sub-portions of the scene based upon the 2D form pattern.

3. A method according to claim 2, including recursively updating the 2D form pattern and determining projections of lower level sub-portions with reference to the updated form pattern.

4. A method according to claim 3, wherein the step of recursively updating the 2D form pattern includes bit shifting values representing coordinates of vertices of the form pattern.

5. A method according to claim 4, wherein the step of recursively updating the 2D form pattern includes calculating an offset from a minimum value of a bounding box about a form pattern of previous iteration of the recursion.

6. A method according to claim 1, wherein the data structure comprises an Octree and wherein the step of processing the data structure comprises traversing the Octree.

7. A method according to claim 6, wherein said portions correspond to parent and child octants associated with the Octree.

8. A method according to claim 6 including determining a sequence for processing nodes of the Octree in front to back order relative to a predetermined viewing position.

9. A method according to claim 6 including testing if bounds of an octant intersect a view frustum.

10. A method according to claim 5 including performing an occlusion test prior to writing to said display.

11. A computer graphics system comprising a processor in communication with a memory device storing a data structure for a three dimensional (3D) scene and arranged to control a display device, the processor being arranged to:
   process the data structure to retrieve data defining said scene;
   create a three dimensional bounding box for enclosing one or more portions of the scene;
   project the three dimensional bounding box onto a screen space with perspective;
   calculate if a back or rear face of the bounding box perspective projected on the screen space appears is smaller than a front face of the bounding box perspective by less than one pixel and deem said portions to have satisfied a predetermined condition and,
   render said portions of the scene with an orthogonal projection; and
   otherwise render the other portions of the scene that do not satisfy the predetermined criteria upon the display device using a perspective projection;
   whereby the number of calculations performed by the electronic processor for rendering the scene are reduced by use of the orthogonal projection relative to rendering using only the perspective projection.

12. A system according to claim 11, wherein the processor of the computer graphics system is further arranged to:
   project 3D points associated with the portions of the scene satisfying the predetermined condition from 3D to 2D to produce a 2D form pattern; and
   determine projections of sub-portions of the scene based upon the 2D form pattern.

13. A system according to claim 11, wherein the processor of the computer graphics system is preferably further arranged to:
   project 3D points associated with the portions of the scene satisfying the predetermined condition from 3D to 2D to produce a 2D form pattern; and
   determine projections of sub-portions of the scene based upon the 2D form pattern without a further 3D to 2D projection of the sub-portions.

14. A computer graphics software product comprising a computer readable media bearing tangible, non-transitory instructions for execution by a processor for carrying out a method according to claim 1.

15. A computer graphics method implemented by an electronic processor based system including at least one processor, said method comprising the steps of operating said at least one processor to:
   process a data structure containing data for a three-dimensional (3D) scene to be represented by an electronic display;
   create a three dimensional bounding box for enclosing one or more portions of the scene;
   project the three dimensional bounding box onto a screen space with perspective;
   calculate if a back or rear face of the bounding box perspective projected on the screen space appears is smaller than a front face of the bounding box perspective by less than one pixel and deem said portions to have satisfied a predetermined condition and, render said portions of the scene satisfying the predetermined condition with an orthogonal projection; and otherwise rendering portions of the scene not satisfying the predetermined condition by using a perspective projection;

whereby the number of calculations performed by the electronic processor for rendering the scene are reduced relative to rendering using only the perspective projection.

* * * * *